(12) United States Patent
Morimoto et al.

(10) Patent No.: US 8,165,455 B2
(45) Date of Patent: Apr. 24, 2012

(54) DATA PROCESSING APPARATUS AND DATA PROCESSING METHOD, AND COMPUTER PROGRAM

(75) Inventors: Naoki Morimoto, Tokyo (JP); Kenichiro Aridome, Kanagawa (JP); Yukio Isobe, Kanagawa (JP); Atsushi Mae, Kanagawa (JP)

(73) Assignee: Sony Corporation, Tokyo (JP)

( * ) Notice: Subject to any disclaimer, the term of this patent is extended or adjusted under 35 U.S.C. 154(b) by 521 days.

(21) Appl. No.: 12/443,891

(22) PCT Filed: Oct. 1, 2007

(86) PCT No.: PCT/JP2007/069166
§ 371 (c)(1),
(2), (4) Date: Jun. 5, 2009

(87) PCT Pub. No.: WO2008/044518
PCT Pub. Date: Apr. 17, 2008

(65) Prior Publication Data
US 2010/0034508 A1  Feb. 11, 2010

(30) Foreign Application Priority Data
Oct. 5, 2006 (JP) ................ 2006-273696

(51) Int. Cl.
*H04N 5/93* (2006.01)
*H04N 5/92* (2006.01)
*H04N 5/84* (2006.01)

(52) U.S. Cl. ........ 386/278; 386/283; 386/326; 386/332; 386/334; 386/335; 348/565

(58) Field of Classification Search ............ 386/278, 386/283, 326, 332, 334, 335; 348/565
See application file for complete search history.

(56) References Cited

U.S. PATENT DOCUMENTS

| | | | |
|---|---|---|---|
| 6,999,674 B1 * | 2/2006 | Hamada et al. | 386/241 |
| 7,716,259 B2 * | 5/2010 | Aridome et al. | 707/822 |
| 2004/0223747 A1 * | 11/2004 | Otala et al. | 386/125 |
| 2007/0269187 A1 * | 11/2007 | Morimoto et al. | 386/95 |
| 2008/0046614 A1 * | 2/2008 | Aridome et al. | 710/65 |
| 2009/0047002 A1 * | 2/2009 | Morimoto et al. | 386/125 |

FOREIGN PATENT DOCUMENTS

| | | |
|---|---|---|
| JP | 2001 238169 | 8/2001 |
| JP | 2004 336128 | 11/2004 |
| JP | 2005 286366 | 10/2005 |
| WO | 2006 088100 | 8/2006 |

\* cited by examiner

*Primary Examiner* — Helen Shibru
(74) *Attorney, Agent, or Firm* — Oblon, Spivak, McClelland, Maier & Neustadt, L.L.P.

(57) ABSTRACT

Division editing of a movie stream file picked up for a recording application is executed while conforming to a predetermined standard format.

When a stream file is divided at an arbitrary division point, a preceding chapter is created by giving padding in an end region of a GOP including the division point in accordance with a length alignment restriction. Furthermore, a first extent of a succeeding chapter is created by copying the GOP including the division point and a GOP immediately succeeding it, a region formed of GOPs after the copied portion is used as a second extent of the succeeding chapter, and padding is given to an end region of the second extent in accordance with the length alignment restriction.

11 Claims, 15 Drawing Sheets

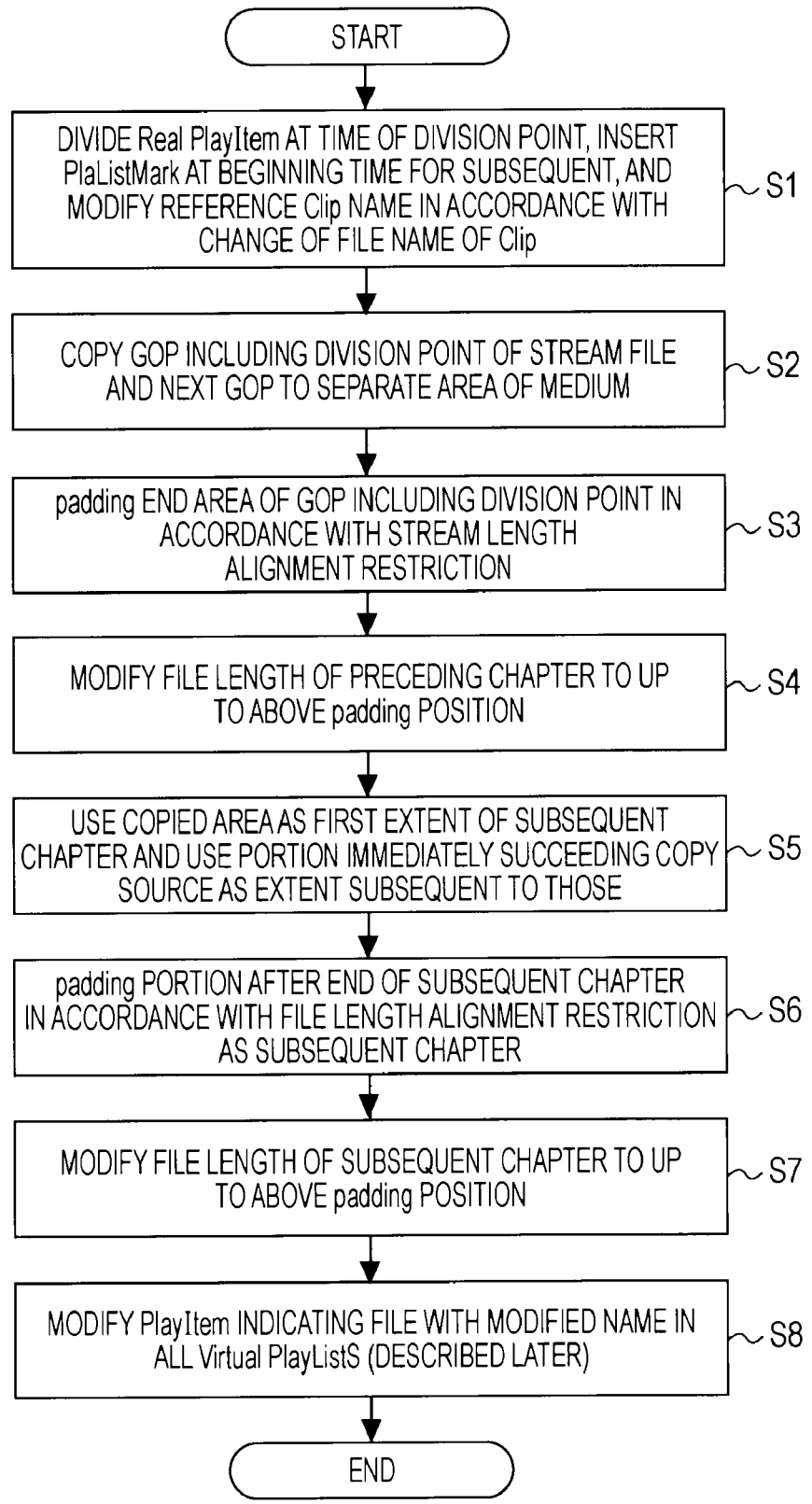

DATA PROCESSING APPARATUS AND DATA PROCESSING METHOD, AND COMPUTER PROGRAM

TECHNICAL FIELD

The present invention relates to data processing apparatuses and data processing methods and computer programs for executing processing such as recording or playing of data. Particularly, the present invention relates to data processing apparatuses and wireless communication methods and computer programs for executing data processing such as recording or editing of a movie stream picked up by a digital video camera.

More specifically, the present invention relates to data processing apparatuses and data processing methods and computer programs for executing processing for editing a movie stream recorded on a recording medium together with accompanying management information according to a predetermined standard format, and particularly relates to data processing apparatuses and data processing methods and computer programs for division editing of content picked up for the purpose of recording according to a predetermined standard format.

BACKGROUND ART

Disk-type recording media in which optical reading is applied, such as DVD (Digital Versatile Disk) and CD (Compact Disk) (hereinafter referred to as "optical disk"), are rapidly coming to be used commonly for the purpose of saving computer files or movie streams. Optical disks have large storage capacities, and allow random access.

Recording/playing apparatuses that use optical disks are already in common use, for example, as external recording media and external storage devices for computers. Recently, in accordance with the increase in the recording capacities of disk-type recording media, video cameras of the type that saves movies on a disk instead of on a conventional recording tape (e.g., refer to Patent Document 1) have appeared.

Disk-type recording media allow random access, so that it is possible to efficiently find desired scenes, and since data is accessed in a contactless manner, the recording media can be used without being degraded. For example, DVD video cameras, since their release in the year 2000, are coming to be used by an increasing number of users year by year due to favorable image quality and usability such as support for editing.

For example, the AVCHD standard, while inheriting contents of existing disk format standards as appropriate, defines specification regarding a data format and so forth for High Definition (HD) video cameras by adding recording compatibility and additional recording compatibility functions. The AVCHD standard employs the MPEG-4 AVC/H.264 scheme, having a high compression rate, and its main object is to allow recording of HD images on a low-capacity low-speed recording medium. Although recording on DVD disks is assumed, it is possible to perform recording on various recording media, such as memory cards or HDDs, according to the AVCHD standard format (e.g., refer to Non-Patent Document 1 and Non-Patent Document 2).

In the AVCHD standard, MPEG (Moving Picture Experts Group)-2 System has already been determined as the movie stream file format. Note that a complex file structure is provided in which in addition to saving a stream file alone on a recording medium, a plurality of accompanying management information files for playing or editing the movie files are saved. That is, in the case of movie content encoded as an MPEG2-TS stream, a set of data forming a unit that needs to be played in such a manner that continuous synchronous playing, i.e., real-time playing, is ensured is recorded as one clip (Clip), i.e., a clip AV stream (ClipAVStream) file. Furthermore, when this clip AV stream file is recorded on a recording medium, management information files of the types called a playlist (PlayList) file and a clip information (ClipInformation) file are recorded in accompany therewith.

The clip information file is a file that exists as a pair with a clip AV stream file and in which information regarding a stream, needed to play an actual stream, is described. A playlist can specify play segments and play order of movie data by registering play items (PlayItem) describing play segments formed of play start points (IN points) and play end points (OUT points) for clips and arranging a plurality of play items in order of time. Furthermore, in the playlist, it is possible to put a playlist mark (EntryMark) that serves as an entry point for access to the stream by a user. A segment defined by adjacent entry marks constitutes a minimum editing unit visible to the user, i.e., a "chapter". Furthermore, a recording editing function can be realized suitably by using management information files such as clip information and playlists.

Furthermore, in the AVCHD standard, as attributes of a playlist, in addition to real playlists (Real PlayList) having bodies of content (i.e., clip AV streams), virtual playlists (Virtual PlayList) not having bodies of content are defined. Editing of a real playlist is editing of the body of content, i.e., destructive editing involving change in components themselves on a recording medium. In contrast, editing of a virtual playlist only redefines play start points and play end points for a clip AV file, so that non-destructive editing is allowed, which does not alter the body of content itself.

In non-destructive editing, it is readily possible to perform rearrangement of the positions or deletion of components that are referred to on a playlist visible to the user by operations on management information files, and the original form of stream data on a recording medium can be maintained. On the other hand, in a recording application, there are cases where the convenience for the user is improved if division editing of content that has been picked up is allowed. That is, management of content, such as backup, is facilitated if, in addition to inserting a playlist mark at a desired entry point in a playlist to provide a new chapter, a stream file is divided at a chapter boundary so that one-to-one corresponding relationship between chapters and stream files is maintained.

In a movie stream encoding scheme such as MPEG, a GOP (Group of Picture) structure, in which several frames are collected into one set, is employed. In a GOP, frames of different types, namely, an I/IDR picture obtained through intra-frame encoding, a P picture obtained through inter-frame forward predictive encoding, and a B picture obtained through bilateral predictive encoding, are arranged according to a predetermined rule, and random access to individual GOPs is allowed in the movie stream. In such a case, since it is possible to divide the stream only at the position of a GOP boundary, in a case where a specified division point does not coincide with a GOP boundary, a problem arises as to how to divide the stream.

For example, according to a proposed file dividing and joining method (e.g., refer to Patent Document 2), padding packets are provided in an empty portion from the file beginning of the latter portion of a divided file (cluster boundary) to the first GOP boundary, a padding portion provided at the time of division of a file is formed of one or more private stream packets, information of the padding portion provided at the time of division is provided in the same packets, and the padding portion is deleted efficiently at predetermined timing on the basis of the information in the padding portion, so that the capacity in the recording medium is used efficiently.

Furthermore, according to a proposed method of editing a stream (e.g., refer to Patent Document 3), in consideration that audio data becomes incomplete in the proximity of a division position when an MPEG-2 transport stream is divided, in a stream ahead of the division position, a TS packet in which video information TS packet is replaced with dummy data not including either video signals or audio signals so that audio frame data crossing the division position is formed completely, and in a stream after the division position is overwritten with a TS packet in which audio information is replaced with dummy data until occurrence of audio information packet data that coincides with play timing of video information at the division position. According to this editing method, it is possible to remove audio data that could cause such an abnormal sound or silent state that the user would feel a sense of unnaturalness when the two streams generated by the division are decoded and played.

Furthermore, according to a proposed video and audio signal editing method (e.g., refer to Patent Document 4), when division editing is performed at a boundary of video signal data constituting a GOP, in a case where a transport packet of audio signal data that does not satisfy the data structure of a decoding unit exits in divided video signal data, the transport packet is replaced with a transport packet not including video information and audio information, and an overwrite recording is performed on a recording medium.

However, in a case where a restriction on management size defined for each file system or physical type of recording medium exits, division is not allowed even at a GOP boundary in a stream. For example, in a DVD-like recording medium, 2K byte constitutes one sector, and an ECC (Error Collection Code) block composed of 16 sectors, i.e., 32 Kbytes, is used as an access block, i.e., a unit of management in a file system (refer to FIG. 13), and it is not allowed to divide an ECC block.

Furthermore, in the AVCHD standard described above, a length alignment restriction dictating that the stream file length be a multiple of 6K bytes is defined (refer to FIG. 14), and there are cases where it is not possible to comply with this restriction simply by dividing a stream at GOP boundaries.

Note that, in a case where a stream at the time of recording is a non-closed GOP of AVC, even if the stream is divided at a GOP boundary, it is not possible to decode and play a frame preceding the first I or IDR picture at the beginning of the subsequent portion. Furthermore, even in a closed GOP, a similar problem arises if division at a non GOP boundary is desired.

Patent Document 1:
Japanese Unexamined Patent Application Publication No. 2004-120364
Patent Document 2:
Japanese Unexamined Patent Application Publication No. 2005-286366
Patent Document 3:
Japanese Unexamined Patent Application Publication No. 2005-117556
Patent Document 4:
Japanese Unexamined Patent Application Publication No. 2004-336128
Non-Patent Document 1:
http://www.avchd-info.org/
Non-Patent Document 2:
http://support.d-imaging.sony.co.jp/www/handycam/products/be nri/avchd/index.html

DISCLOSURE OF INVENTION

Technical Problem

It is an object of the present invention to provide an advantageous data processing apparatus and wireless communication method and a computer program with which it is possible to suitably execute data processing such as recording or editing of a movie stream on a predetermined recording medium, picked up by a digital video camera.

It is a further object of the present invention to provide an advantageous data processing apparatus and wireless communication method and a computer program with which it is possible to suitably execute processing for editing a movie stream recorded according to a predetermined standard format together with management information.

It is a further object of the present invention to provide an advantageous data processing apparatus and wireless communication method and a computer program with which it is possible to execute division editing of a movie stream file picked up for a recording application while conforming to a predetermined standard format.

It is a further object of the present invention to provide an advantageous data processing method and wireless communication method and a computer program with which it is possible to divide a movie stream file that employs a GOP structure at an arbitrary division point while conforming to a predetermined standard format.

Technical Solution

The present invention has been made in view of the problems described above, and a first aspect thereof is a data processing apparatus that executes processing for editing a stream file recorded on a recording medium according to a predetermined standard format, characterized in that the data processing apparatus includes, when the stream file is divided at an arbitrary division point into a preceding chapter and a succeeding chapter, first means for copying a first extent of the succeeding chapter, formed of data in the proximity of a GOP including the division point (e.g., the GOP including the division point and a GOP immediately succeeding it), onto the recording medium;

second means for creating a stream file of the preceding chapter by giving padding in accordance with the length alignment restriction at a GOP boundary that appears first after the division point; and third means for creating a stream file of the succeeding chapter formed of the first extent and a second extent, from a position where padding has been given at the beginning of the first extent of the succeeding chapter, formed of GOPs before or after the copied segment, or by giving padding in an end region of the second extent in accordance with the length alignment restriction.

The AVCHD standard has been defined with a main aim of allowing recording of high-definition video signals on low-capacity and low-speed recording media. According to the AVCHD standard format, recording on various recording media is allowed, such as DVD disks, memory cards, or HDDs.

In the AVCHD standard, MPEG(-2 System has already been determined as the movie stream file format. A complex file structure is provided in which in addition to saving a stream file alone on a recording medium, a plurality of accompanying management information files for playing or editing the movie files are saved. Furthermore, in the AVCHD standard, as attributes of a playlist, in addition to real playlists having bodies of content, virtual playlists not having bodies of content are defined. Non-destructive editing is allowed by simply redefining play start points and play end points for a clip AV file using a virtual playlist.

Non-destructive editing can be readily executed through operations on management information files. However, in a recording application, in some cases, user's convenience is improved if division editing of content that has been picked up is allowed. For example, by dividing a stream file so that one-to-one corresponding relationship between "chapters", which are minimum units of editing visible to the user, and stream files is maintained, management of content, such as backup, is facilitated.

However, a GOP structure, in which a number of frames is collected into one set, is employed in a movie stream encoding scheme such as MPEG, so that a problem arises as to the method of division in a case where a specified division point does not coincide with a GOP boundary. Furthermore, in a case where a restriction on management size of an ECC block or the like defined for each file system or physical type of recording medium exits, division is not allowed even at a GOP boundary in a stream. Furthermore, in the AVCHD standard, a length alignment restriction dictating that the stream file length be a multiple of 6K bytes is defined, and there are cases where it is not possible to comply with this restriction simply by dividing a stream at GOP boundaries.

Thus, in the data processing apparatus according to the present invention, when a stream file is divided into a preceding chapter and a succeeding chapter at an arbitrary division point, not limited to a GOP boundary, padding is given in accordance with the length alignment restriction to an end region of a GOP including the division point, thereby creating a preceding chapter. Padding refers to processing for overwriting the recording medium with packets corresponding to invalid packets in order to prevent occurrence of problems at the time of decoding of a stream.

Furthermore, a first extent of the succeeding chapter is created by copying the GOP including the division point and the GOP immediately succeeding it, and a region formed of GOPs after the copied GOPs is used as a second extent of the succeeding chapter, and padding is given to an end region of the second extent in accordance with the length alignment restriction. As a result, the succeeding chapter formed of the first and second extents can satisfy both the restriction on management size in the file system and the length alignment restriction defined in the AVCHD standard.

For example, by dividing a stream file at a playlist mark inserted in a playlist as an entry point for the user, it is possible to maintain one-to-one corresponding relationship between "chapters", which are minimum units of editing visible to the user, and stream files.

Furthermore, the second means specifies a time of the division point as a play end time of a play item regarding the preceding chapter so that a portion after the division point becomes a non-display segment. Similarly, the third means specifies the time of the division point as a play start time of a play item regarding the succeeding chapter so that a portion of the first extent before the division point becomes a non-display segment. Thus, it is possible to avoid duplicate playing of the preceding chapter due to the first extent being created by copying the GOP including the division point and the GOP immediately succeeding it.

Furthermore, the second means defines the file length of the preceding chapter to be up to the position where the padding has been given, and the third means defines the file length of the succeeding chapter to be from the position where padding has been given at the beginning of the first extent or up to the position where padding has been given in the second extent, so that the portion after the padding position becomes a region unused as a file.

The data processing apparatus according to the present invention further includes file-name modifying means for modifying a file name of the stream file of the preceding or succeeding chapter.

Furthermore, in the AVCHD standard, in addition to real playlists having bodies of content, virtual playlists not having bodies of content are defined. In conjunction with modification of the file name of the stream file of the succeeding chapter by the file-name modifying means, it is necessary to execute processing for modifying a stream file name indicated by a play item in the virtual playlist specifying the succeeding chapter as a play segment.

Furthermore, a second aspect of the present invention is a computer program, written in a computer-readable format, for executing, on a computer, processing for editing a stream file recorded on a recording medium according to a predetermined standard format, characterized in that:

the stream file has a GOP (Group of Picture) structure, in which a predetermined number of picture frames are collected into one set, data is recorded on the recording medium in units of an access block having a predetermined length, and the standard format defines a length alignment restriction regarding files, when the stream file is divided at an arbitrary division point into a preceding chapter and a succeeding chapter, the computer program causes the computer to execute:

a procedure of copying a first extent of the succeeding chapter, formed of data in the proximity of a GOP including the division point, onto the recording medium;

a procedure of creating a stream file of the preceding chapter by giving padding in accordance with the length alignment restriction at a GOP boundary that appears first after the division point;

a procedure of creating a stream file of the succeeding chapter formed of the first extent and a second extent, from a position where padding has been given at the beginning of the first extent of the succeeding chapter, formed of GOPs before or after the copied segment, or by giving padding in an end region of the second extent in accordance with the length alignment restriction.

The computer program according to the second aspect of the present invention defines a computer program written in a computer-readable format so that predetermined processing is achieved on a computer 2. That is, by installing the computer program according to the second aspect of the present invention on the computer 2, cooperative operation occurs on the computer so that the same operations and advantages as those of the data processing apparatus according to the second aspect of the present invention can be achieved.

Advantageous Effects

According to the present invention, it is possible to provide an advantageous data processing apparatus and wireless communication method and a computer program with which it is possible to execute division editing of a movie stream file picked up for a recording application while conforming to a predetermined standard format.

Furthermore, according to the present invention, it is possible to provide an advantageous data processing method and wireless communication method and a computer program with which it is possible to divide a movie stream file that employs a GOP structure at an arbitrary division point while conforming to a predetermined standard format.

According to the present invention, for example, a stream file recorded on a recording medium, such as a DVD, according to the AVCHD standard format can be divided suitably in conjunction with division of a playlist file accompanying the stream file. Thus, it is possible to maintain one-to-one corresponding relationship between chapters and stream files, so that management of content, such as backup, can be readily performed.

Other objects, features, and advantages of the present invention will become apparent from more detailed description based on embodiments of the present invention described later or accompanying drawings.

BRIEF DESCRIPTION OF DRAWINGS

FIG. 9 is a flowchart showing a processing procedure for dividing a stream file into a preceding chapter and a succeeding chapter at a chapter boundary in conjunction with a playlist mark being newly added to a real playlist.

Figure 1:
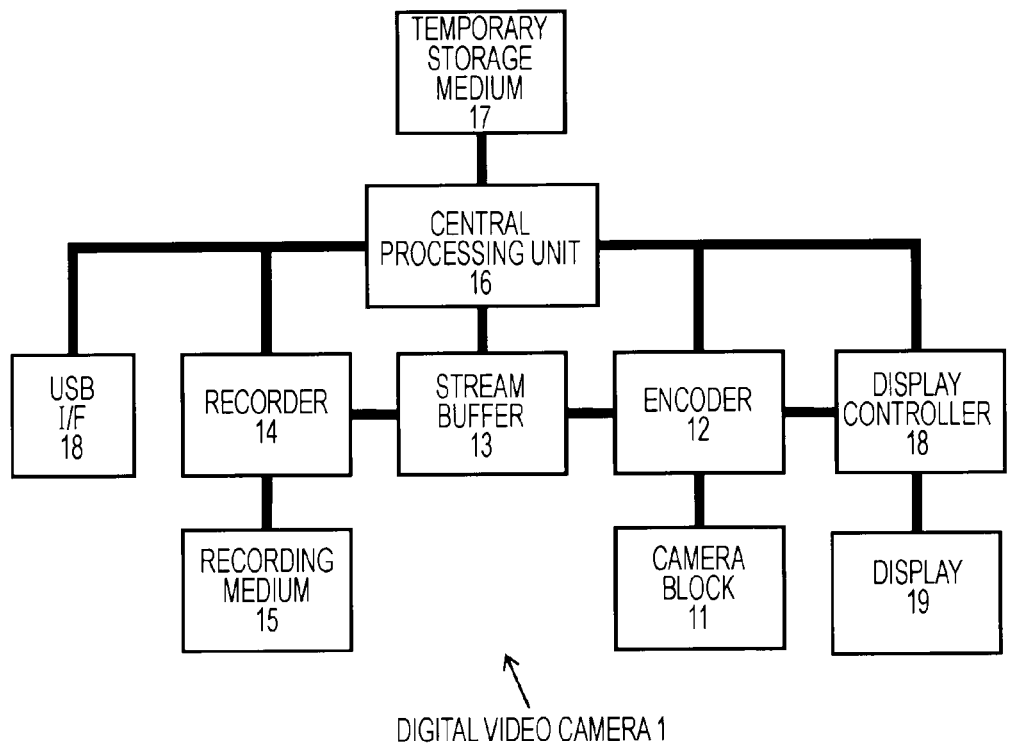
FIG. 1 is a diagram schematically showing the internal configuration of a digital video camera 1 according to the present invention.

| Explanation of Reference Numerals | |
|---|---|
| 1 | digital video camera |
| 11 | camera block |
| 12 | encoding/decoding processor |
| 13 | stream buffer |
| 14 | recorder |
| 15 | recording medium |
| 16 | CPU |
| 17 | temporary storage medium |
| 18 | display controller |
| 19 | display |

BEST MODES FOR CARRYING OUT THE INVENTION

Embodiments of the present invention will be described below in detail with reference to the drawings.

FIG. 1 schematically shows the internal configuration of a data processing apparatus according to the present invention. As shown in the figure, the data processing apparatus is configured as a digital video camera 1, and is configured to encode a movie stream picked up by a camera block 11 into an MPEG2-TS stream by an encoding/decoding processor 12 and to record it on a recording medium 15 provided internally in the device by a recorder 14 according to the AVCHD standard.

A central processing unit 16 exercises overall control on processing operations of the digital video camera 1 as a whole, by a form of loading an execution programs on a temporary storage medium 17 formed by a RAM (Random Access Memory) or the like and executing the programs while temporarily storing system variables and environment variables.

The processing operations by the central processing unit 16 mentioned herein include movie pickup in the camera block 11 and camera work involved in the movie pickup, such as an auto focus function, automatic exposure, handshake correction, and auto shutter, a formatting process of a recording area of the recording medium 15 by the recorder 14, a mounting process of the recording medium 15, recording of a movie stream in the recording area and playing of the movie stream, processing for editing a movie stream recorded on the recording medium 15, processing for operation as a USB slave, i.e., a mass storage device (note that this applies to the case of USB connection), and so forth. The processing for editing of a movie stream on the recording medium 15 includes non-destructive editing, which involves only operations such as rearranging the positions of parts or deleting parts that are referred to on a playlist visible to the user so that data of the stream on the recording medium is not edited, and destructive editing, which involves changing the parts themselves on the recording medium. In this embodiment, in consideration of user's convenience, as a type of destructive editing, it is allowed to perform division editing of content (stream file) picked up for a recording application. Such processing will be described later in detail.

The camera block 11 includes a lens for capturing an image of an object, a solid-state image pickup element that generates electronic image signals through photoelectric conversion in accordance with the amount of input light, such as a CCD (Charge Coupled Device) or a CMOS (Complementary Mental-Oxide Semiconductor), an A/D converter that converts the image signals into digital signals, a demosaic processor that calculates RGB signals from the digital image signals, and so forth (not shown). This RGB image is displayed and output from a display 19 via a display controller 18.

The encoding/decoding processor 12 executes processing for encoding and decoding movie streams. More specifically, the encoding/decoding processor 12 encodes a movie stream input from the camera block 11 according to the MPEG2-TS scheme to output an AV stream composed of TS packets having a fixed byte length. The TS packets are temporarily stored in a stream buffer 13 and then transferred to the recorder 14. Upon receiving TS packets at specific time intervals via the stream buffer 13, the recorder 14 records the TS packets on the recording area of the recording medium 15. Furthermore, the encoding/decoding processor 12 decodes a movie stream read by the recorder 14 from the recording medium 15, and outputs a played frame from the display 19 via the display controller 18.

Note that image data is input to a decoding module of the encoding/decoding processor 12 by an integer multiple of GOP. However, when the play start time or play end time of a play item specifies a segment less than a GOP, nothing is output for the segment although processing for decoding image data is executed (i.e., mute or previous-frame hold occurs), i.e., the segment becomes a "non-display segment" (described later).

The recorder 14 executes recording of files or other management data on the recording medium 15. Furthermore, the recorder 14 can record a movie stream in a format compliant with the AVCHD standard so that a recording editing function is realized. The recording medium 15 referred to herein is, for example, a portable medium such as a DVD or an installed medium such as a hard disk. However, the physical type of the recording medium 15 is not particularly limited as long as it is compliant with the AVCHD standard format.

The display controller 18 controls driving of the display 19. From the display 19, according to instructions from the central processing unit 16, an operation screen (touch panel) for the digital video camera 1 is provided, video image captured by the camera block 11 is displayed and output, or a movie stream decoded by the encoding/decoding processor 12 is played and output.

When connected to a USB master (e.g., a personal computer (not shown) or the like) via a USB cable (not shown) from a USB interface 18, the recorder 14 and the recording medium 15 operate as a USB slave, i.e., as a mass storage device externally connected to the USB master. While the USB connection is maintained, the function as a digital video camera is disabled.

The AVCHD standard is a standard for video cameras, mainly directed to allowing recording of high-definition video signals on low-capacity and low-speed recording media. While inheriting the contents of existing disk format standards as appropriate, the AVCHD standard adds recording-compatibility and additional-writing-compatibility functions and defines specification regarding data formats and so forth for HD video cameras. More specifically, when movie content picked up by a video camera is encoded into an MPEG2-TS stream (ClipAVStream) and recorded, various types of accompanying files called playlists (PlayList) and clip information (ClipInformation) are used, so that a recording editing function can be realized suitably.

Figure 2:
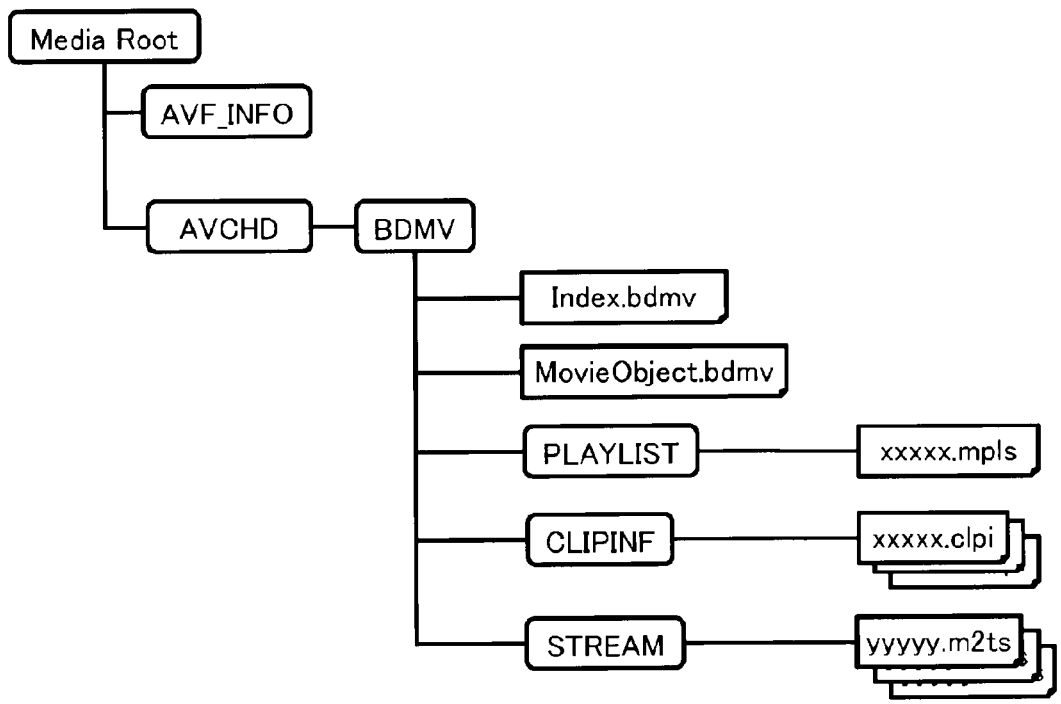
FIG. 2 is a diagram showing a directory structure of a recording medium 15, defined in the AVCHD standard.

FIG. 2 shows a directory structure of the recording medium 15, defined in the AVCHD standard. "PLAYLIST", "CLIP-INF", and "STREAM", provided directly under a BDMV directory, are subdirectories for storing playlists, clip information files, and clip AV stream files, respectively.

Movie data is recorded as a single movie file in which a set of data forming a unit that needs to be played in such a manner that continuous synchronous playing, i.e., real-time playing, is ensured constitutes one clip (Clip), i.e., a clip AV stream file. The clip AV stream is a file in which a movie stream is stored in the MPEG2-TS format. Furthermore, a clip information file is a file that exists as a pair with the clip AV stream file and in which information regarding a movie stream, needed to play an actual movie stream, is described. Furthermore, a playlist is composed of a plurality of play items (PlayItem). Each play item specifies a play start point (IN point) and a play end point (OUT point) for the clip. In the playlist, play segments and play order of movie data are specified according to a sequence of play items on the time axis.

Figure 3:
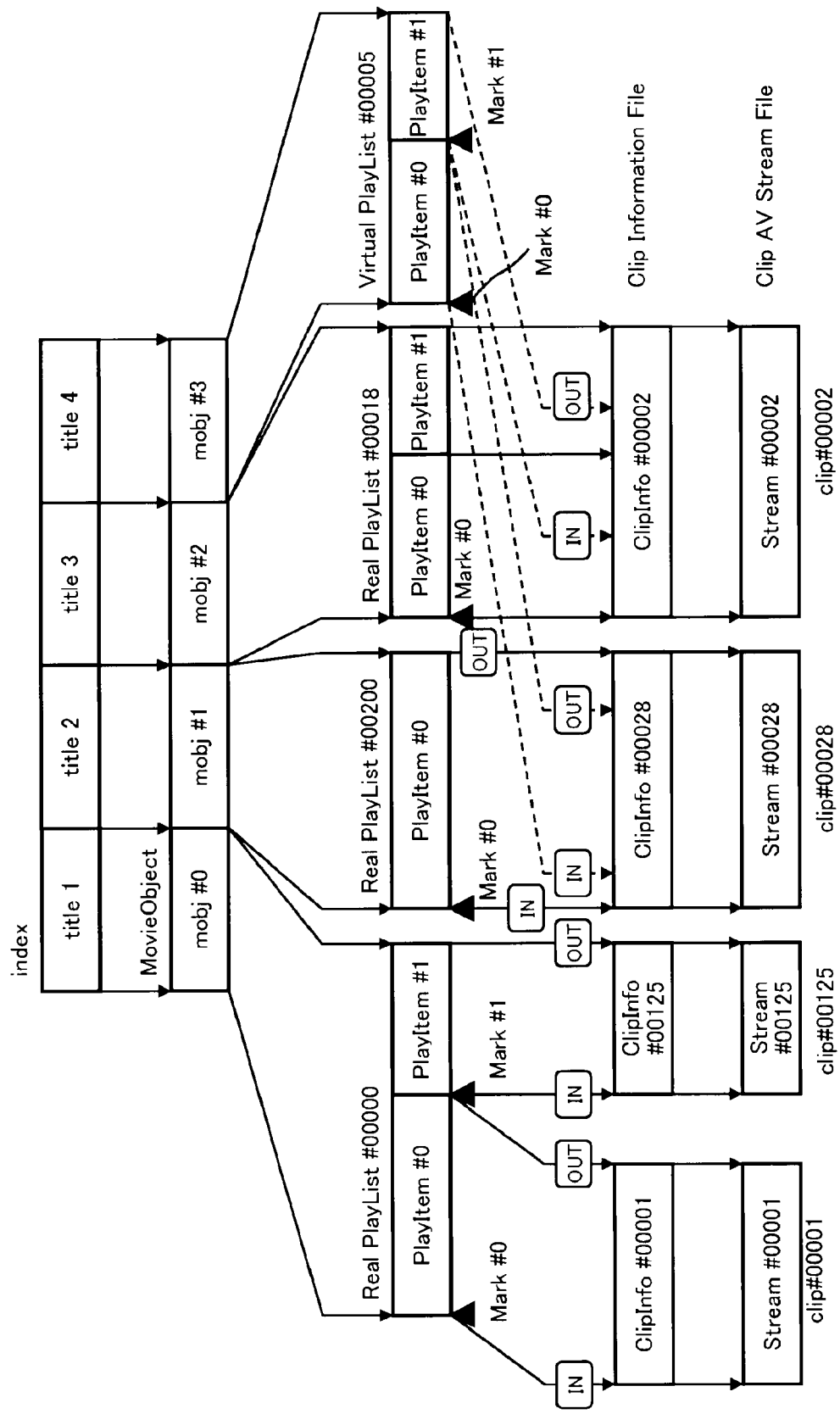
FIG. 3 is a diagram showing an example of a logical data structure for recording user data on the recording medium 15 according to the AVCHD standard format in such a form that recording editing is allowed.
Figure 4A:
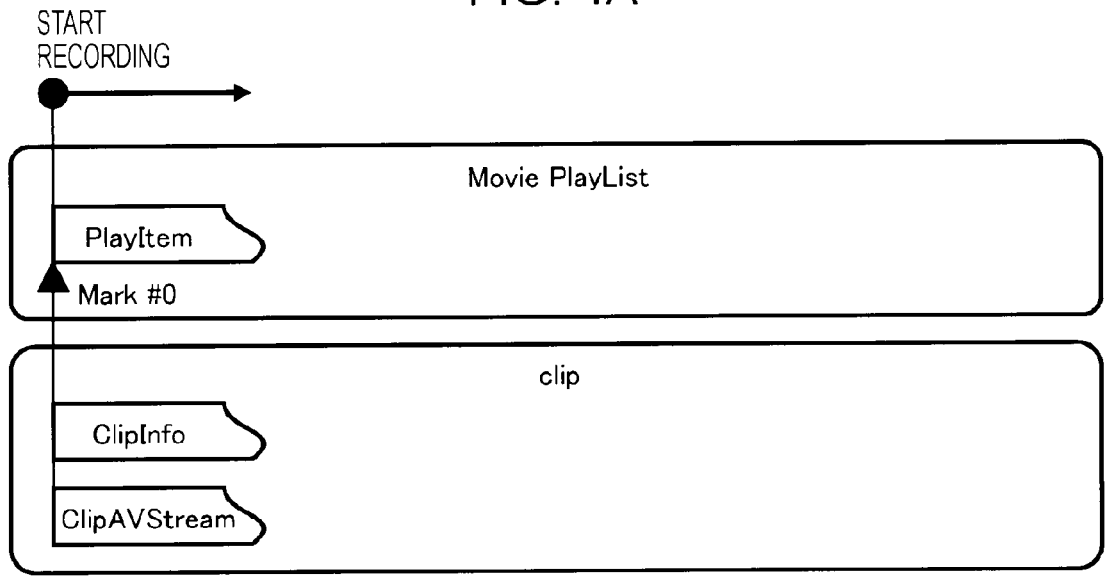
FIG. 4A is a diagram for explaining a procedure of generating a playlist together with clips of a movie stream in accordance with recording or image pickup by a digital video camera.
Figure 4B:
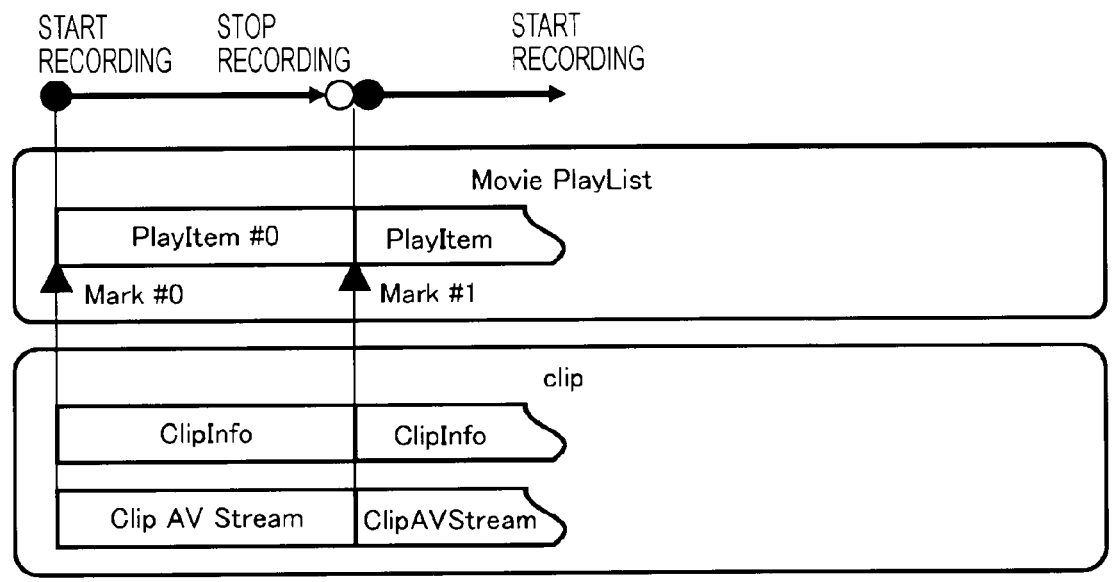
FIG. 4B is a diagram for explaining a procedure of generating a playlist together with clips of a movie stream in accordance with recording or image pickup by a digital video camera.
Figure 4C:
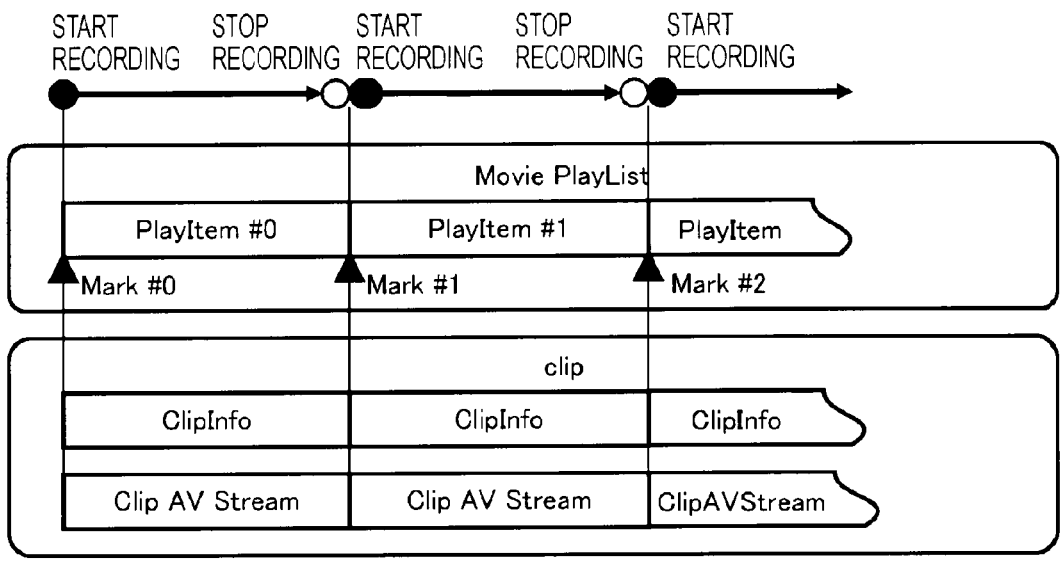
FIG. 4C is a diagram for explaining a procedure of generating a playlist together with clips of a movie stream in accordance with recording or image pickup by a digital video camera.
Figure 4D:
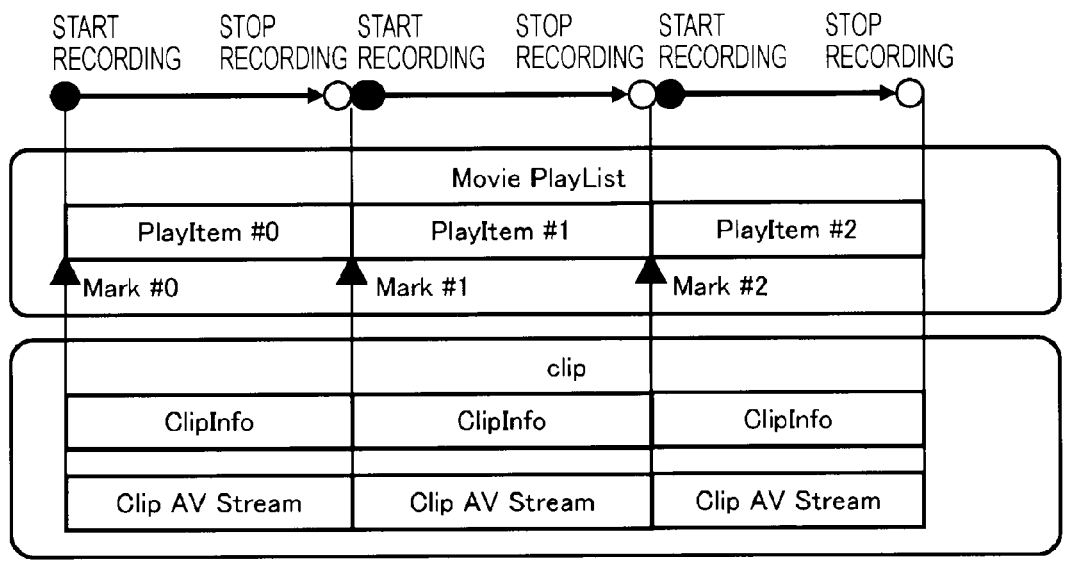
FIG. 4D is a diagram for explaining a procedure of generating a playlist together with clips of a movie stream in accordance with recording or image pickup by a digital video camera.

FIG. 3 shows an example of a logical data structure for recording user data on the recording medium 15 in such a format that recording editing is allowed. As shown in the figure, when movie data picked up by the digital video camera 1 is encoded into an MPEG2-TS stream and recorded, files of the types called index (Index), movie object (MovieObject), playlist (PlayList), clip information (ClipInformation), and clip AV stream (ClipAVStream) are used.

TABLE 1

| File type | Maximum number | Role |
| --- | --- | --- |
| index | 1 | Base file for managing the entire medium. Manages corresponding relationship between titles presented to the user and MovieObject. In the AVCHD format, the play order of playlists, which should originally be managed in the MovieObject file, is managed in metadata of the index file. |
| MovieObject | 1 | File that manages playlists that are played when titles are specified. |
| Real PlayList | 2000 in total | Playlist for original titles. Video that is recorded and played is registered in order of recording. |
| Virtual PlayList | | Playlist for creating a user-defined playlist through non-destructive editing. Virtual playlist does not have Clip of its own, and specifies and plays Clip registered in one of real playlists. |
| Clip Information | 4000 | Exists as a pair with the Clip AV Stream file, and describes information regarding a stream, needed to play an actual stream. |
| Clip AV Stream | 4000 | File storing a stream recorded in MPEG2-TS. AVC image data is saved in this file. |

The entire storage area on the recording medium 15 is managed in a file type layer of the index (index.bdmv). An index file is created for each title presented to the user, thereby managing corresponding relationship with a movie object. The "title (Title)" referred to herein is a set of (user-recognizable) playlists (PlayList), and is generally composed of content of one program or date-based content. In the AVCHD standard format, the play order of playlists, which should originally be managed in the movie object file, is managed in metadata of the index file. Upon loading a recording medium on a player, first, the index is read, so that the user can view titles described in the index.

The movie object is a set of commands for controlling playing. For example, in the existing ROM standard format, the movie object is a file that manages playlists that are played when titles are specified. References to movie objects are listed in the index as entries to titles. However, in the AVCHD format, without reference to the movie object file, relationship between playlists and titles is managed using metadata of the index file.

A playlist is provided in correspondence with a title presented to the user, and is composed of one or more play items (PlayItem). Each play item has a play start point (IN point) and a play end point (OUT point) for a clip to specify a play segment thereof. Furthermore, in the playlist, a plurality of play items are arranged on the time axis to specify the play order of individual play segments of the movie stream. Furthermore, play items specifying play segments in different clip AV stream files can be included in one playlist.

Reference relationship between clips and playlists can be set freely. For example, one clip can be referred to from two playlists with different IN points and OUT points. Furthermore, reference relationship between titles and movie objects can also be set freely. Playlists are broadly classified into two types, namely, real playlists (RealPlayList) and virtual playlists (VirtualPlayList), according to reference relationship with clips.

A real playlist is a playlist for an original title (a playlist having a body of content), in which play items regarding a movie stream recorded or picked up by a video camera are arranged in order of recording.

A virtual playlist is a playlist for creating a user-defined playlist through non-destructive editing. A virtual playlist does not have clips (AV streams) of its own, and play items in the playlist refer to clips registered in one of the real playlists or partial ranges thereof. That is, the user can cut out play segments as needed from a plurality of clips and collect (copy) the individual play items referring to these play segments to edit a virtual playlist.

A clip is a file of movie data recorded as a set of data forming a unit that needs to be played in such a manner that continuous synchronous playing, i.e., real-time playing, is ensured, and is composed of a clip AV stream file (Clip AV Stream) and a clip information file (Clip Information).

The clip AV stream file as content data is a file storing a movie stream recorded on the recording medium 15 in the MPEG2-TS format. In the AVCHD standard format, a movie stream is stored in this file.

The clip information file is a file that exists as a pair with the clip AV stream file and that defines attributes regarding a movie stream, needed to play an actual movie stream. More specifically, the clip information file includes information defining a method of encoding a movie stream, the size of the movie stream, play time→address conversion, play management information, and so forth.

Next, a procedure for generating a playlist together with clips of an AV stream according to an image pickup operation by the digital video camera 1 will be described with reference to FIGS. 4A to 4D.

As shown in the figures, for each segment from when the user starts recording to when the user stops recording, one play item is created. For example, the segment from when recording is first started to when recording is stopped is registered as a play item having a serial number 0 (PlayItem#0) in a movie playlist (Movie PlayList). Furthermore, the segment from when recording is started next to when recording is stopped is registered as a play item having a serial number 1 (PlayItem#1) in the movie playlist (Movie PlayList) (and similarly thereafter).

A real playlist corresponds one to one to a body of content, i.e., a clip AV stream, and each play item registered in a real playlist holds time information of a play start point and a play end point of the corresponding play segment of the clip AV stream. Furthermore, in a movie stream, such as MPEG2-TS, "seamless play", i.e., continuous play across streams, is allowed by performing encoding so that a predetermined buffer model will not be broken by an underflow, overflow, or the like of an internal buffer. Each play item (note that this does not apply to the play item at the beginning of the playlist) holds a connection condition with the immediately previous play item (i.e., whether seamless play is allowed or not).

Furthermore, each time the user starts recording, Mark as an entry mark (EntryMark) is added at the beginning of a play item (an entry mark in a playlist is a type of "playlist mark (PLM)"). In a playlist, one or more playlist marks exist, each having a role of indicating a specific play position of the clip AV stream. Within one playlist, serial numbers that are sequential along the time axis are assigned to individual playlist marks. Furthermore, each playlist mark registered in the playlist holds a serial number of the play item to which the mark is assigned and timestamp information indicating a play position of the clip AV stream.

One clip AV stream file is formed at the end of a stream that has been recorded or picked up. One clip AV stream serves as a unit that needs to be played in such a manner that continuous synchronous playing, i.e., real-time playing, is ensured. Furthermore, together therewith, a clip information file defining a method of encoding a stream, the size of the movie stream, play time→address conversion, play management information, and so forth is created.

Although it is defined that a playlist mark must be placed at the beginning of a movie playlist (MoviePlayList), through subsequent editing operations, it is possible to move the position of a playlist mark on the time axis or to insert a new playlist mark.

Each playlist mark serves as an entry point for access to the stream by the user. Thus, a segment defined between adjacent entry marks (and a segment from the last playlist mark to the end of the last play item) serves as a minimum editing unit visible to the user, i.e., a "chapter". By arranging play items according to a play order and arranging playlist marks according to a desired play order, a play order of the segments of the clip AV stream registered in the playlist is defined.

In actual product specifications, a plurality of real playlists are presented together to the user as a sequence of chapters. For example, on an editing screen of a digital video camera, a list of thumbnails of still-picture frames at positions of individual playlist marks defining chapters (or thumbnail movies having play start points at the positions of the playlist marks) is displayed, so that a chapter-based editing environment is provided to the user.

As described earlier, in the AVCHD standard, as attributes of playlists, in addition to real playlists (Real PlayList) having bodies of content (i.e., clip AV streams), virtual playlists (Virtual PlayList) not having bodies of content are defined. Editing of a virtual playlist involves only redefining a play start point and a play end point for a clip AV file, so that non-destructive editing, which does not change the body of content itself, is allowed.

Such division editing is non-destructive editing, which can be readily performed by operations on management information files. Considering user's convenience, in addition to non-destructive editing through operations on virtual playlists, it is desired to allow destructive editing, such as division editing of content picked up for a recording application.

In the AVCHD standard, it is possible to divide a chapter by adding a playlist mark having a desired division point as an entry point to a playlist (including both a real playlist and a virtual playlist). Regarding this, in addition to inserting a playlist mark to a real playlist, if a stream file is divided at the position of the insertion, advantageously, file management (backup or division to recording media) is facilitated by maintaining one-to-one corresponding relationship between "chapters", which are minimum editing units visible to the user, and stream files.

Here, a procedure of dividing a stream file by inserting a playlist mark will be described in the context of an example of a file structure conforming to the AVCHD standard, shown in FIG. 5. As described earlier, a clip information file exists as a pair with a clip AV stream, and the clip AV stream is registered in a movie playlist (hereinafter simply referred to as a "playlist"). It is assumed that the playlists in the figure are real playlist having clips.

In MoviePlayList#10, PlayItem#0 and PlayItem#1 are registered as play items specifying play segments in Clip#20, and a play item PlayItem#2 specifying a partial play segment of Clip#31 is registered. Furthermore, playlist marks PLM#0, PLM#1, PLM#2, and PLM#3 are inserted at the beginning position of PlayItem#0, the beginning position and middle position of PlayItem#1, and the middle position of PlayItem#2, respectively.

Furthermore, in subsequent MoviePlayList#11, PlayItem#0 and PlayItem#1 are registered as play items specifying play segments in Clip#31. Furthermore, playlist marks PLM#0, PLM#1, and PLM#2 are inserted at the beginning position of PlayItem#0 and the beginning position and middle position of PlayItem#1, respectively.

Figure 5:
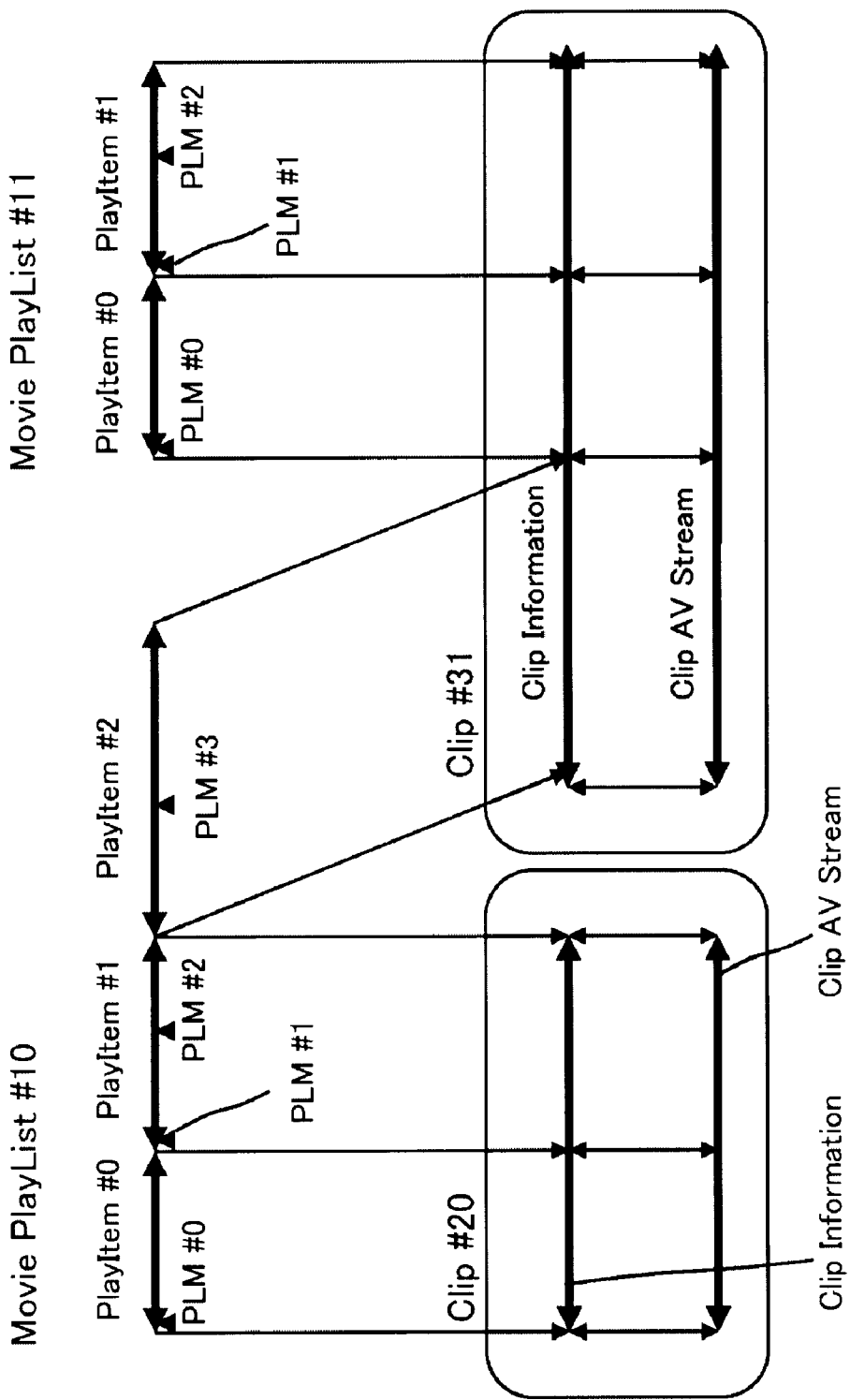
FIG. 5 is a diagram showing an example of a file structure in AVCHD.

The playlists shown in FIG. 5 are real playlists having bodies of clip AV stream files. Operation on the playlists is destructive editing, which involves changes in the clip AV streams and clip information.

Figure 6:
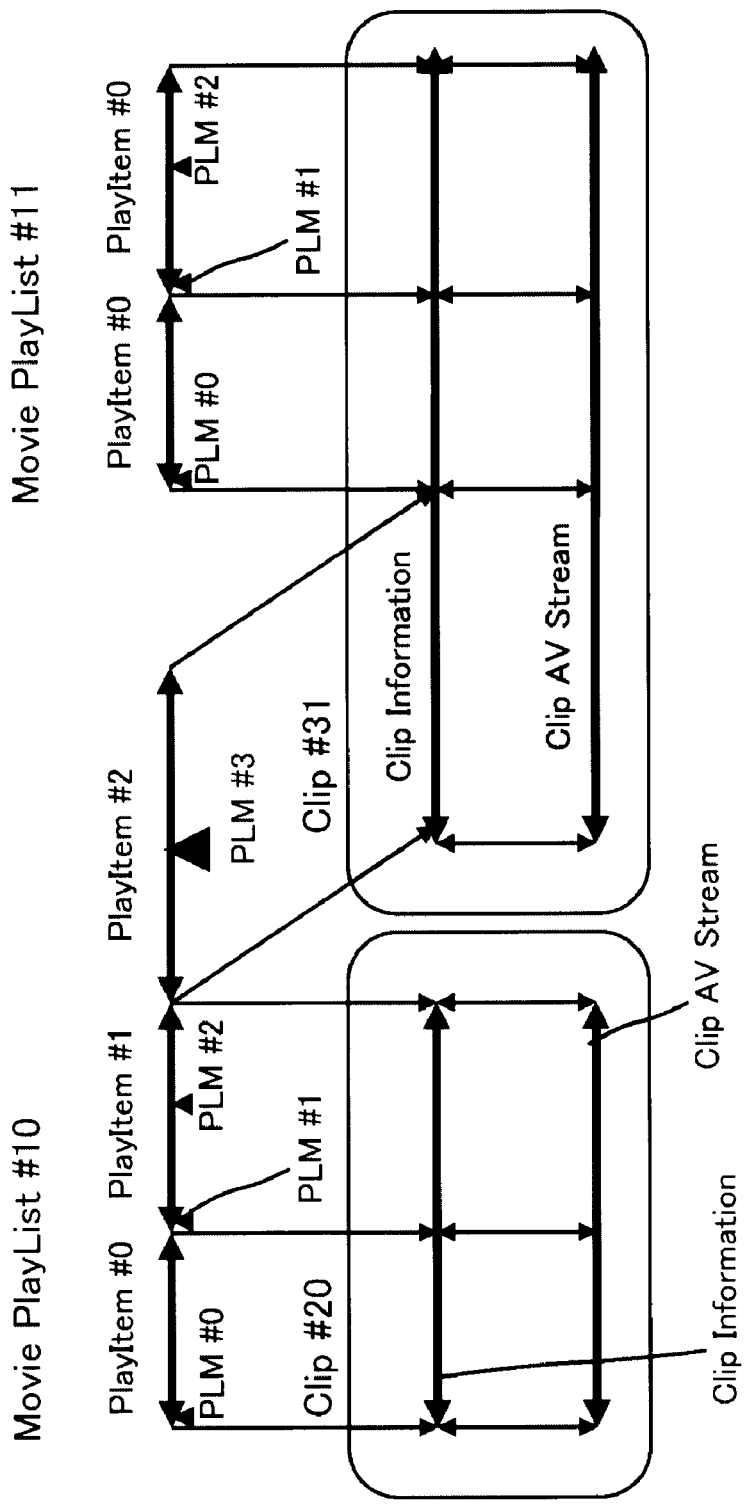
FIG. 6 is a diagram showing how a playlist mark PLM#3 is inserted in a play item PlayItem#2.

Assume here that the playlist mark PLM#3 is inserted at the middle position of the play item PlayItem#2 to specify a position of division of the stream file, as shown in FIG. 6.

Figure 7:
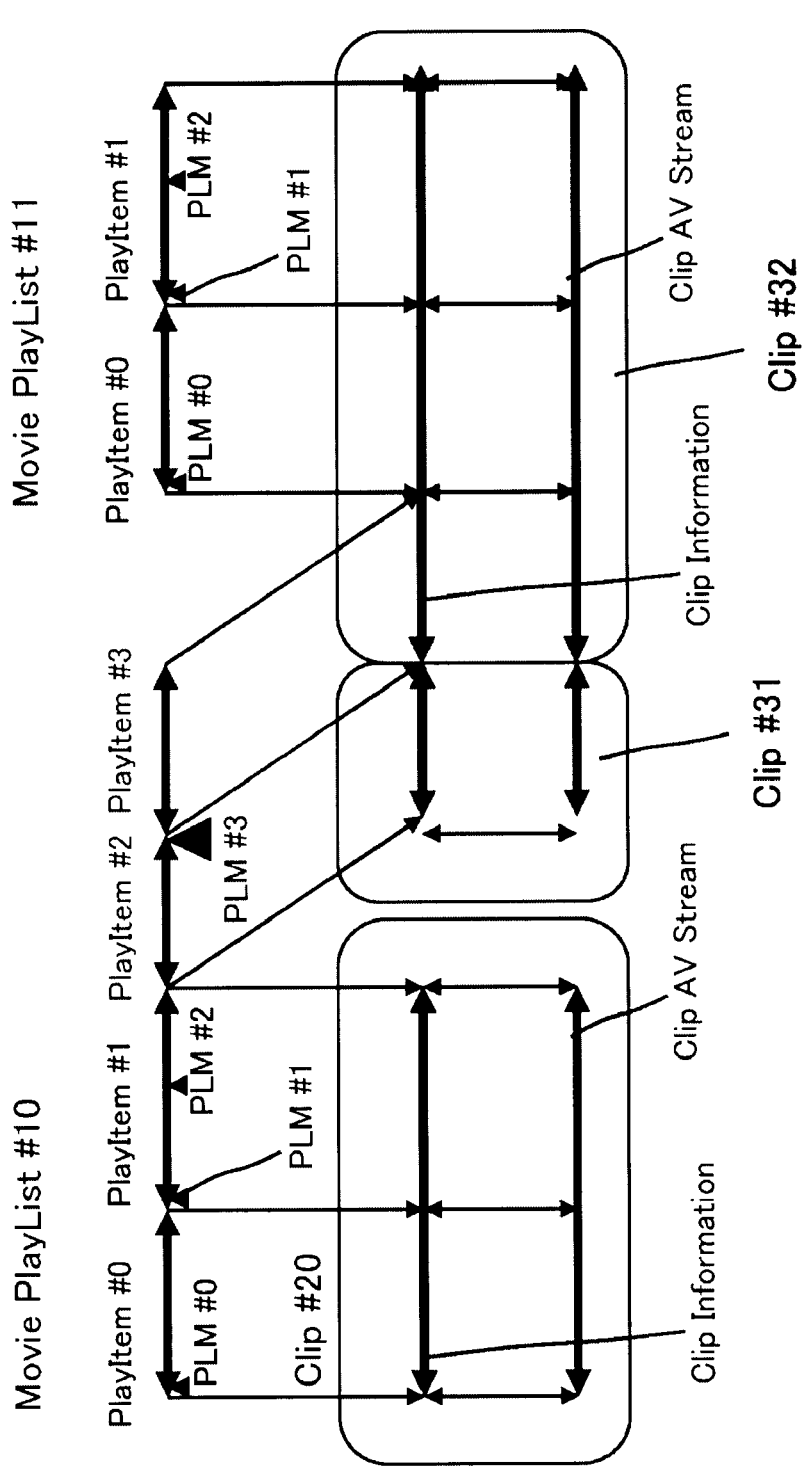
FIG. 7 is a diagram showing how a play item PlayItem#2 and corresponding Clip#31 are divided in conjunction with insertion of a playlist mark PLM#3 in the play item PlayItem#2.

In this case, as shown in FIG. 7, the play item PlayItem#2 is divided at the position of the playlist mark PLM#3, and the clip #31 is also divided at the entry point indicated by the playlist mark PLM#3. Thus, a new play item PlayItem#3 is created in the playlist 10. Then, the play end point of the play item PlayItem#2 is overwritten with the time stamp position of the playlist mark #3. Furthermore, the time stamp position of the playlist mark #3 is written to the play start point of the new play item PlayItem#3, and the play end point of the original play item PlayItem#2 is written to the play end point thereof.

Furthermore, the clip #31 is divided at a time corresponding to the place of insertion of the playlist mark #3, and is divided into files of a preceding clip #31, which inherits the original file name and so forth, and a succeeding clip #32.

By executing processing for dividing a playlist file by insertion of a playlist mark as described above, it is possible to maintain one-to-one corresponding relationship between chapters and stream files, so that content management, such as backup, is facilitated.

However, a GOP structure is employed in a movie stream encoding scheme such as MPEG, so that a problem arises as to the method of division in a case where a specified division point does not coincide with a GOP boundary. Furthermore, in a case where a restriction on management size of an ECC block or the like defined for each file system or physical type of recording medium exits, division is not allowed even at the position of a GOP boundary in a stream. Furthermore, in the AVCHD standard, a length alignment restriction dictating that the stream file length be a multiple of 6K bytes is defined, and there are cases where it is not possible to comply with this restriction simply by dividing a stream at GOP boundaries.

Thus, in this embodiment, when a stream file is divided into a preceding chapter and a succeeding chapter at an arbitrary division point, not limited to a GOP boundary, padding is given in accordance with the length alignment restriction to an end region of a GOP including the division point, thereby creating a preceding chapter preceding the division point. Furthermore, a first extent of the succeeding chapter is created by copying the GOP including the division point and the GOP immediately preceding it, and a region formed of GOPs after the copied GOPs is used as a second extent of the succeeding chapter, and padding is given to an end region of the second extent in accordance with the length alignment restriction. As a result, the succeeding chapter formed of the first and second extents can satisfy both the restriction on management size in the file system and the length alignment restriction defined in the AVCHD standard. Note that padding refers to processing for overwriting the recording medium with packets corresponding to invalid packets (also referred to as "null packets") in order to prevent occurrence of problems at the time of decoding of a stream.

Figure 8A:
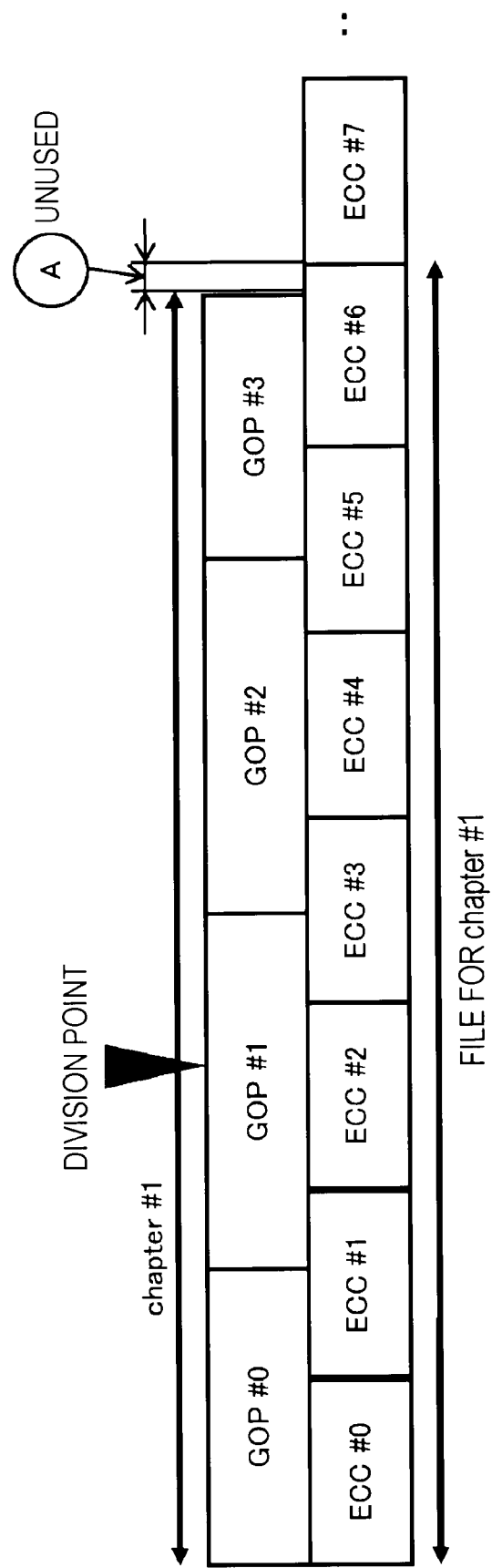
FIG. 8A is a diagram showing how a stream file is divided.
Figure 8B:
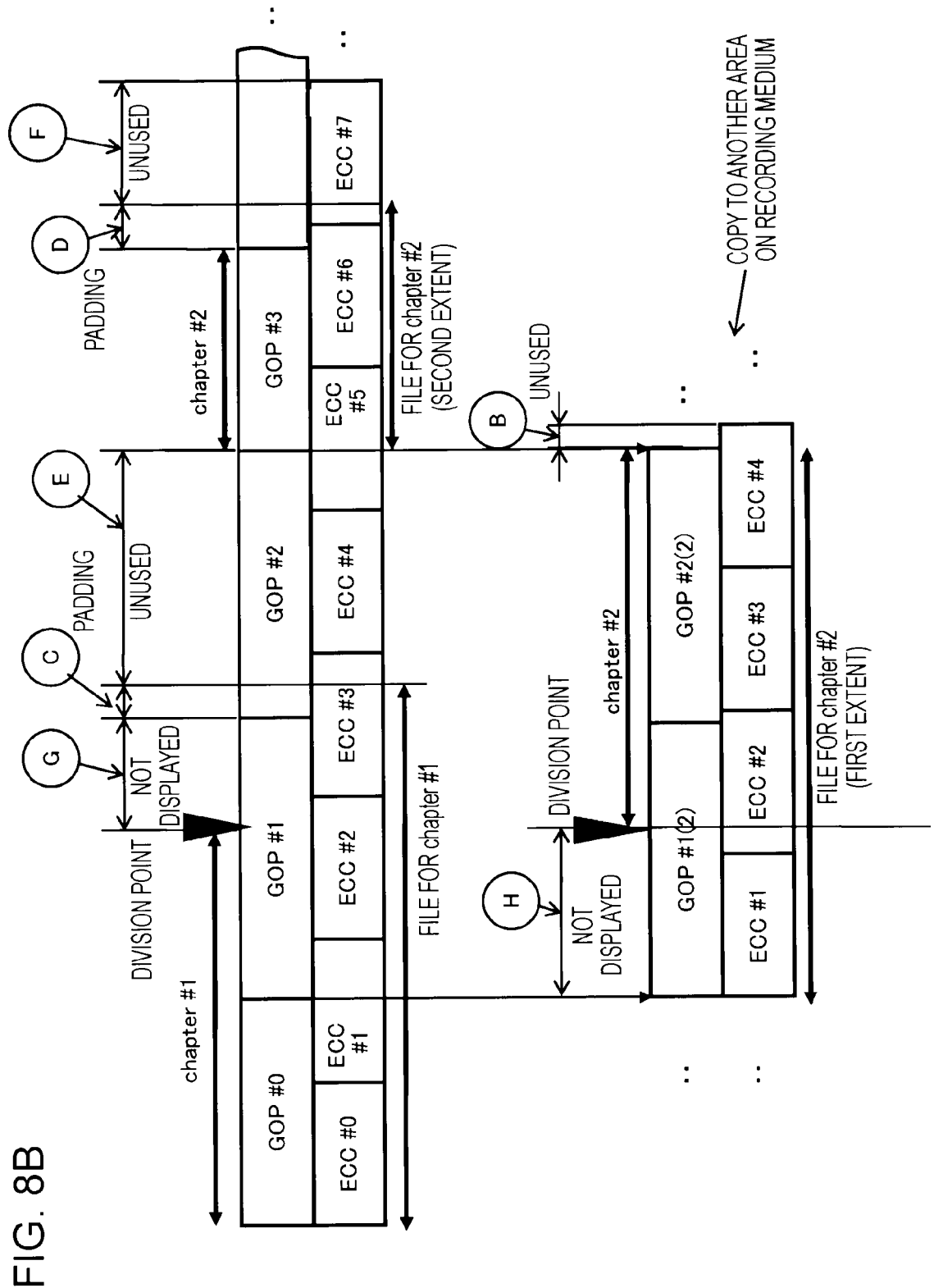
FIG. 8B is a diagram showing how a stream file is divided (note that this is a case where padding is given at the end of a succeeding chapter after division).

FIG. 8B illustrates how a stream file shown in FIG. 8A is divided. Here, first, a case where padding is given at the end of a succeeding chapter after division will be described. Note that the division point can be specified by the user at an arbitrary position of a play segment of a movie stream, for example, via an operation screen displayed on the display 19. However, the division point is not directly specified in the stream file, but the division point is specified by inserting a playlist mark indicating a desired play time for division in a playlist. In the playlist, a play item (or a chapter) is divided at the position of the playlist mark.

Assume that, in the stream file shown in FIG. 8A, a chapter #1 formed of GOP#1 to GOP#3 is divided at a division point indicated by an inverted black triangle mark in the figure. In the file system that manages the recording area on the recording medium uses ECC blocks as access block units, so that, for example, 32 Kbyte, corresponding to an ECC block, serves as a management size restriction. The chapter #1, which is subject to file division, is associated with a stream file formed of ECC#0 to ECC#6 on the file system.

Here, a chapter boundary defined by a play start position and a play end position does not necessarily coincide with a boundary of ECC blocks on the file system. In a play item that manages the chapter #1, as the stream file length, the length up to the end of GOP#3, not the length up to the end of ECC#6, is described. Thus, the portion from the end of GOP#3 to the end of ECC#6 is a redundant data portion, which is a region unused as a stream file (reference character A), i.e., a portion not included in the subject of playing of the stream. The region on the recording medium, unused as a stream file, is not included in any chapter (this similarly applies hereinafter).

As shown in FIG. 8B, the chapter #1 is divided at the specified division point into a chapter #1 (after the division) as a preceding chapter and a chapter #2 as a succeeding chapter succeeding it. The preceding chapter inherits the file name and so forth from the chapter #1 before the division. On the other hand, the succeeding chapter #2 is a new chapter generated by the division, and a new file name and so forth are assigned.

As shown in FIG. 8A, the position of the division point does not coincide with any GOP boundary, and is set at the middle position of GOP#1. Thus, in the example shown in FIG. 8B, first, the portion up to the first GOP boundary after the specified division point, i.e., GOP#0 to GOP#1, is used as the preceding chapter #1 after the file division. Then, GOP#1 including the division point and the immediately succeeding GOP#2 are copied to a separate region on the recording medium to create a first extent of the succeeding chapter #2 after the file division. Hereinafter, the copied GOP#1 and GOP#2 will be denoted as GOP#1(2) and GOP#2(2). Furthermore, a region of GOP#3 and thereafter succeeding the boundary of the last GOP copied to the first extent (i.e., GOP#2) is used as a second extent of the succeeding chapter #2. That is, the succeeding chapter #2 after the division point is formed of the first extent copied to the separate region on the recording medium and the second extent formed of GOPs after the copied portion (existing in the original region on the recording medium).

Here, in the playlist corresponding to the original stream file, a playlist mark specifying the beginning time of the succeeding chapter #2 as an entry point is inserted. At this time, since the play end time (OUT point) of the play item that manages the preceding chapter #1 is overwritten with the time of the division point, of the stream file for the preceding chapter #1, the segment from the time at which the division point is set in GOP#1 to the end of GOP#1 becomes a non-display segment (reference character G). Thus, in a case where the stream file divided into the preceding chapter #1 and the succeeding chapter #2 is played continuously, the portion after the division point of the preceding chapter #1 (the segment from the division point of the divided GOP#1 to the end of GOP#1) is not displayed, so that displayed video image is not duplicated even if playing of the succeeding chapter #2 is started from the beginning of the first extent.

Furthermore, when a playlist mark is inserted at the beginning time of the succeeding chapter #2, since the play start time (IN point) of the play item that manages the succeeding chapter #2 is overwritten with the time of the division point, in the first extent, created by copying GOP#1 and GOP#2 immediately succeeding it, the segment from the beginning of the copied GOP#1(2) to the division point becomes a non-display segment (reference character H). Thus, the segment before the division point of the succeeding chapter #2 becomes a non-display segment, so that displayed video image is not duplicated even if playing of the succeeding chapter #2 is started from immediately after the playing of the preceding chapter #1.

Note that image data is also included in a non-display segment on the recording medium. The decoding module of the encoding/decoding unit 12 receives input in integer multiples of GOP. As described earlier, in a case where the play start time or play end time indicates a segment less than a GOP, no decoding result is output although the decoding module executes decoding, so that the segment becomes a non-display segment.

The first extent of the succeeding chapter #2 is formed of four ECC blocks ECC#1 to ECC#4 on the file system due to the management size restriction of the file system. The redundant portion (reference character B) from the end of GOP#2(2) to the end of ECC#4 becomes a region unused as a stream file, so that it is not included in the subject of playing of the stream. The region on the recording medium, unused as a stream file, is not included in any chapter.

In the AVCHD standard, a length alignment restriction dictating that the stream file length be a multiple of 6 Kbytes is defined (described earlier). Thus, in order to satisfy the length alignment restriction, padding is given at the end portion of the chapter #1 after the division as the preceding chapter (GOP boundary between GOP# and GOP#2) (reference character C). As a result, the preceding chapter #1 can satisfy both the restriction of management size in the file system and the length alignment restriction defined in the AVCHD standard.

Then, the file length of the preceding chapter #1 is modified to be up to the end position where the padding has been given, so that the region (reference number E) after the padding to the start position of the second extent of the succeeding chapter #2 (the GOP boundary with the start of GOP#3) becomes a stream file and becomes an unused region, so that it is not included in the subject of playing of the stream. The region on the recording medium, unused as a stream file, is not included in any chapter.

Furthermore, similarly to the region indicated by the reference character C, also in the end region of the second extent of the succeeding chapter #2 (after the GOP boundary of the end of GOP#3) (reference character D), padding is given in accordance with the length alignment restriction defined in the AVCHD standard. As a result, the succeeding chapter #2 formed of the first and second extents can satisfy both the management size restriction of the file system and the length alignment restriction defined in the AVCHD standard. It is to be well understood that there are cases where, because of division of a chapter, padding is needed in both a preceding file and a succeeding file in order to comply with the length alignment restriction of the format.

Furthermore, the second extent after the padding has been given is formed of ECC#5 to ECC#7 due to the management size restriction of the file system. By modifying the file length of the succeeding chapter #2 to be up to the padding position, of the last ECC#7, the redundant portion after the padding region (reference character D) becomes a stream file and becomes an unused region (reference character F), so that it is not included in the subject of playing of the stream. The region on the recording medium, unused as a stream file, is not included in any chapter.

To sum up what has been described above, the regions indicated by the reference characters B, E, and F are unused as files. Furthermore, the regions indicated by the reference numerals G and H become non-display segments. Furthermore, padding is given in each of the regions indicated by the reference numerals C and D.

Figure 8C:
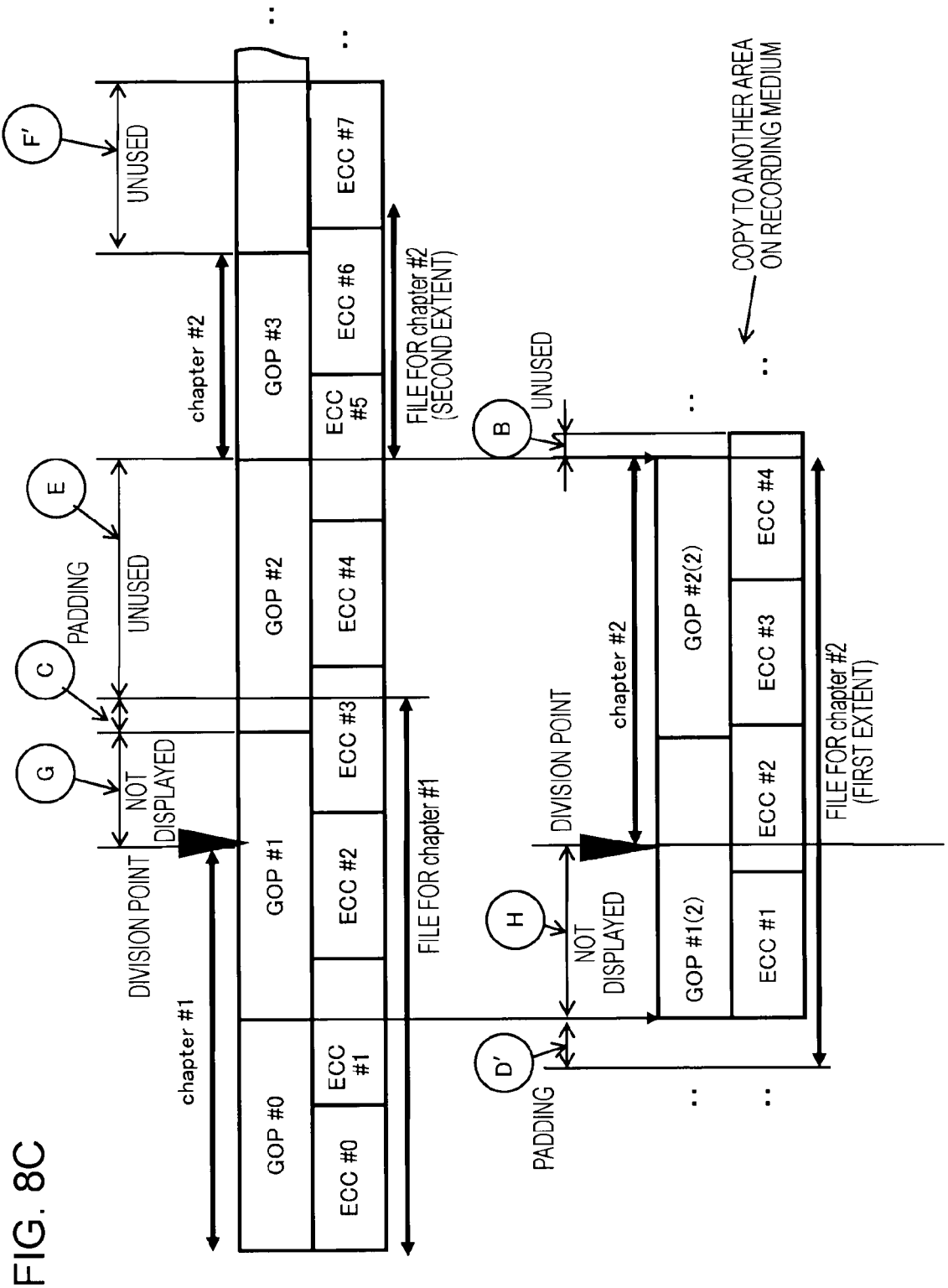
FIG. 8C is a diagram showing how a stream file is divided (note that this is a case where padding is given at the beginning of a succeeding chapter after division).

Note that instead of giving padding in the end region of the second extent of the succeeding chapter #2 as shown in FIG. 8B, by giving padding (reference character D') at the beginning of the first extent (preceding GOP#1(2)) copied to the separate region of the recording medium as shown in FIG. 8C, the succeeding chapter #2 can satisfy both the management size restriction of the file system and the length alignment restriction defined in the AVCHD standard. Furthermore, in the second extent of the succeeding chapter #2, the redundant portion corresponding to the portion after the end of GOP#3 becomes a stream file and becomes an unused region (reference character F').

In the example shown in FIG. 8C, each of the regions indicated by reference characters B, E, and F is unused as a file. Furthermore, each of the regions indicated by reference numerals G and H becomes a non-display segment. Furthermore, padding is given in each of the regions indicated by reference numerals C and D'.

As described above, an original stream file is divided into a stream file for a preceding chapter #1 and a stream file for a succeeding chapter #2 at a playlist mark inserted in a playlist as an entry point for the user, so that it is possible to maintain one-to-one corresponding relationship between "chapters", which are minimum units of editing visible to the user, and stream files.

FIG. 9 shows a processing procedure for dividing a stream file into a preceding chapter and a succeeding chapter at a chapter boundary in conjunction with a playlist mark being newly added to a real playlist, in the form of a flowchart.

First, a division point of the real playlist is divided at a time, a playlist mark is inserted at the beginning time for the succeeding chapter, and the clip name referred to from the playlist is modified in conjunction with change of the file name of the clip (step S1). Furthermore, the file name of the succeeding chapter is modified by selecting it from unused names.

Then, a GOP including the division point of the stream file and the next GOP are copied to a separate region on the recording medium as a first extent of the succeeding chapter (step S2). However, for this processing, in a case where the specified division point is a GOP boundary and is a closed GOP, it suffices to copy only one GOP immediately after the division point. Furthermore, in addition to the above conditions, if the division point satisfies the length alignment restriction of stream files and the division point coincides with a boundary of access blocks of the file system of the recording medium, the processing becomes unnecessary.

In conjunction with the insertion of the playlist mark at the beginning time for the succeeding chapter, the play end time (OUT point) of the play item that manages the preceding chapter is overwritten with the division point, and the segment from the division point to the end of the stream file for the preceding chapter becomes a non-display segment. Furthermore, the play start time (IN point) of the play item that manages the succeeding chapter is overwritten with the division point, and the segment from the beginning of the first extent to the division point becomes a non-display segment.

Then, padding is given in an end region of the GOP including the division point, for an amount in accordance with the length alignment restriction of stream files (step S3).

Then, the file length of the preceding chapter is modified up to the position where padding has been given in step S3 described above (step S4). The region from the end of the padding to the start position of the second extent of the succeeding chapter becomes a stream file and becomes an unused region.

The region copied to the separate region in step S2 is used as a first extent (beginning extent) of the succeeding chapter, and a region immediately succeeding the region copied to the first extent is used as a second extent (succeeding extent) succeeding it (step S5).

Then, to the portion after the end of the succeeding chapter, padding is given in accordance with the length alignment restriction of the file system as a succeeding chapter (step S6).

Then, the file length of the succeeding chapter is modified up to the position where padding has been given in step S6 described above (step S7). The redundant portion after the padding region becomes a stream file and becomes an unused region.

In step S5, the file name of the stream file of the succeeding chapter is modified. In conjunction with such modification of the file name of the stream file of the succeeding chapter, it is necessary to execute processing for modifying the stream file name indicated by a play item in a virtual playlist specifying the succeeding chapter as a play segment. Thus, in step S8, in all virtual playlists, play items indicating the succeeding chapter (stream file) with the modified name are modified.

Figure 10:
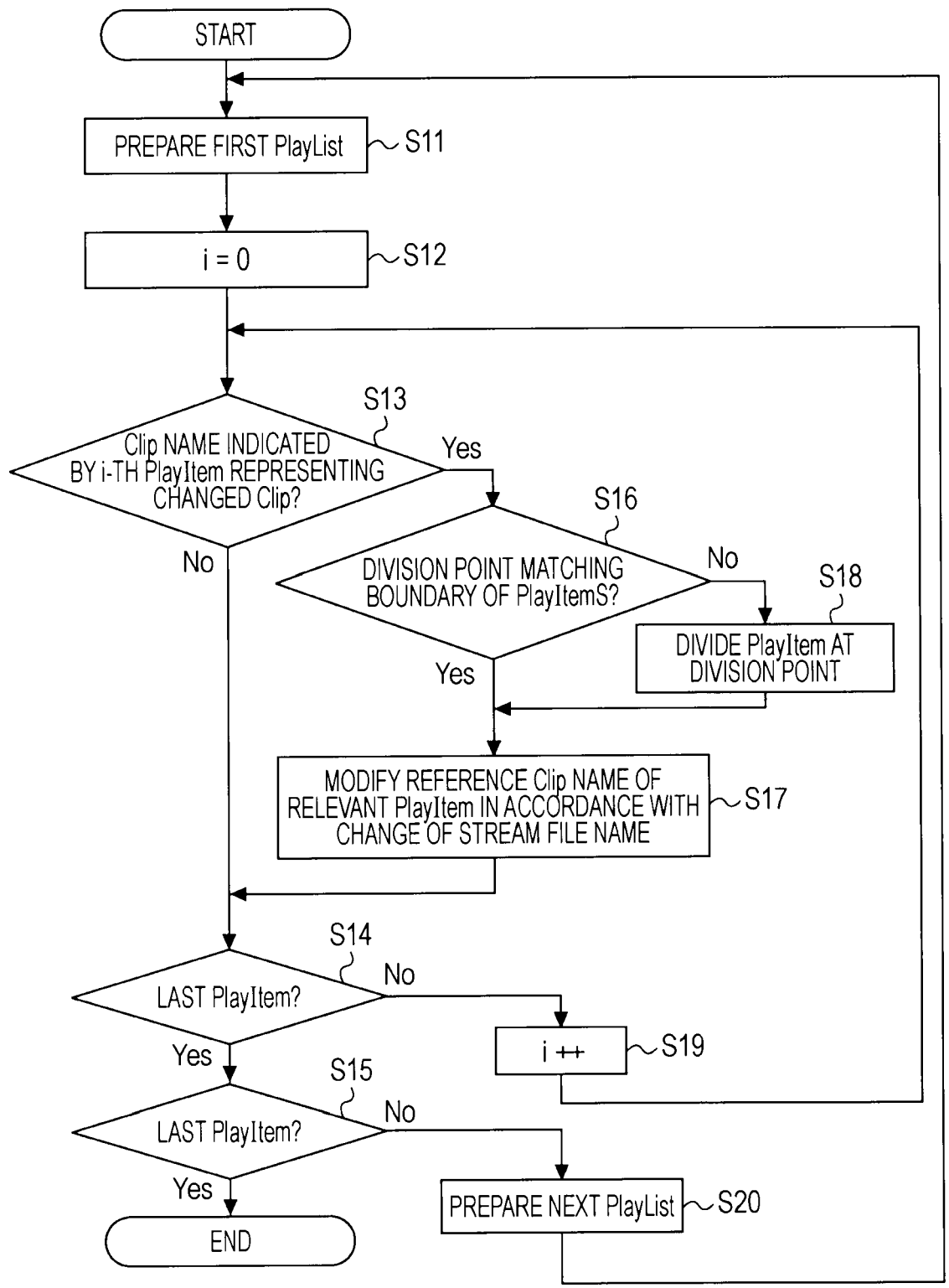
FIG. 10 is a flowchart showing a processing procedure for processing for modifying a virtual playlist in conjunction with division of a stream file.

FIG. 10 shows a processing procedure for modification processing of a virtual playlist in conjunction with division of a stream file, executed in step S8, in the form of a flowchart.

First, the first playlist is prepared (step S11), and a variable i corresponding to a serial number of a play item is set to be an initial value of 0 (step S12).

Here, it is checked whether the clip name indicated by the i-th play item corresponds to a clip changed in conjunction with the division of the stream file (step S13).

If the clip name indicated by the i-th play item corresponds to a clip changed in conjunction with the division of the stream file (Yes in step S13), then, it is checked whether the division point coincides with a boundary of play items (step S16). If the division point does not coincide with a boundary of play items, processing for dividing the play item at the division point is executed (the processing for dividing the play item will be described later) (step S18). Then, in conjunction with the change of the stream file name, the reference clip name of the relevant play item is modified (step S17).

If the clip name indicated by the i-th play item does not correspond to a clip changed in conjunction with the division of the stream file (No in step S13), or when modification of the reference clip name of the play item has been finished in step S16, in a case where any play item yet to be processed remains in the playlist (step S14), i is incremented and then the procedure returns to step S13 (step S19), and the same process described above is repeated for a next play item.

On the other hand, when processing for all the play items in the playlist has been finished (Yes in step S14), if any playlist yet to be processed remains (No in step S15), a next playlist is prepared and the procedure returns to step S12 (step S20), and the same process described above is repeated.

Lastly, a method of processing for dividing a playlist, executed in step S1, step S18, and so forth described above, will be described.

Figure 11:
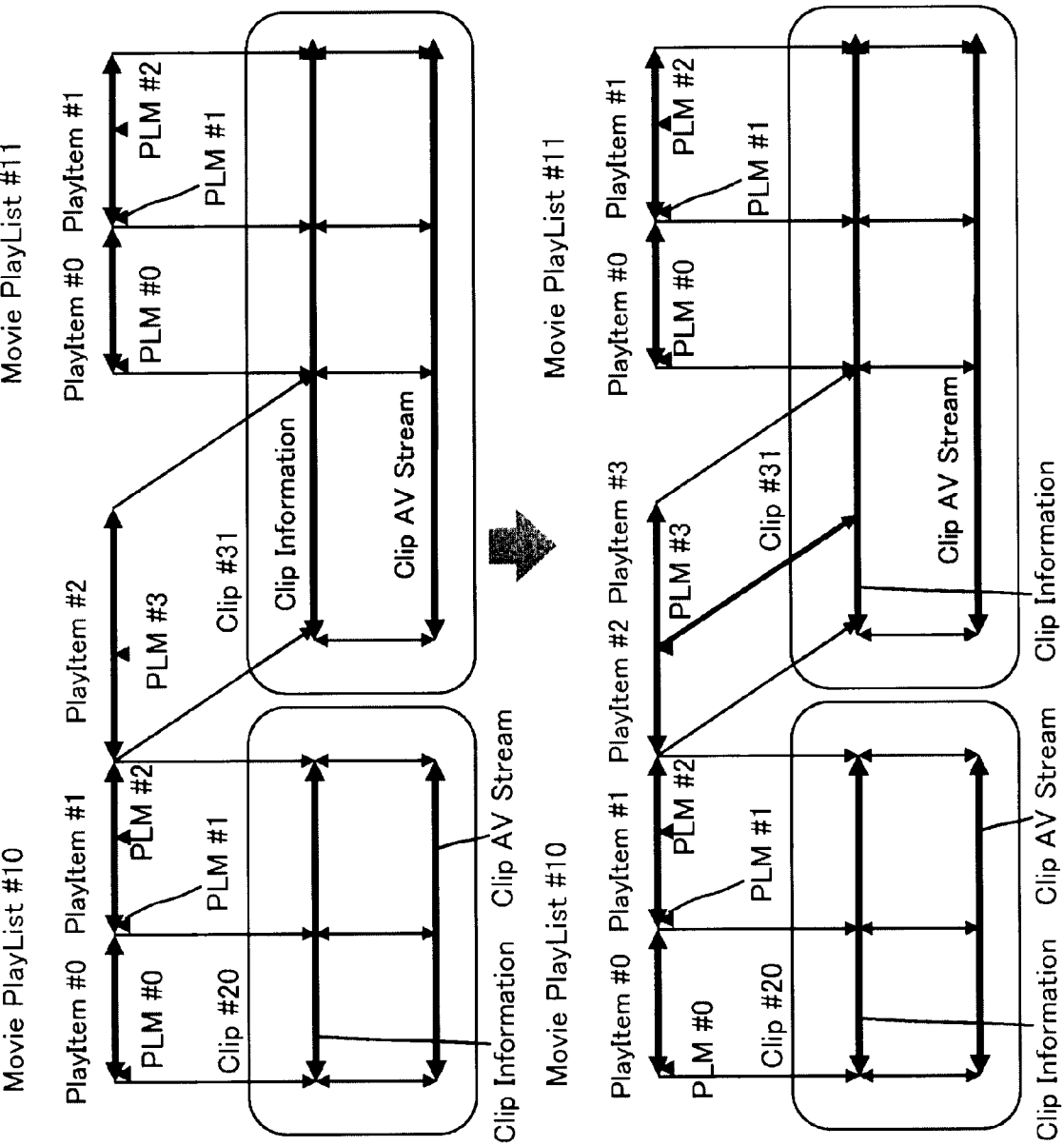
FIG. 11 is a diagram showing how a playlist is divided.

FIG. 11 shows how a playlist is divided. In the example shown in the figure, in MoviePlayList#10 as a virtual playlist, PlayItem#0 and PlayItem#1 are registered as play items specifying play segments in Clip#20, and a play item PlayItem#2 specifying a partial play segment of Clip #31 is registered. Furthermore, playlist marks PLM#0, PLM#1, PLM#2, and PLM#3 are placed at the beginning position of PlayItem#0, the beginning position and middle position of PlayItem#1, and the middle position of PlayItem#2, respectively.

Furthermore, in subsequent MoviePlayList#11, PlayItem#0 and PlayItem#1 are registered as play items specifying play segments in Clip#31. Furthermore, playlist marks PLM#0, PLM#1, and PLM#2 are inserted at the beginning position of PlayItem#0 and the beginning position and middle position of PlayItem#1, respectively.

Here, when the playlist mark PLM#3 is inserted in the play item PlayItem#2 to perform division at the position of insertion, a new play item PlayItem#3 is created. Then, the play end point of the play item PlayItem#2 is overwritten with the time stamp position of the playlist mark #3. Furthermore, the time stamp position of the playlist mark #3 is written to the play start point of the new play item PlayItem#3, and the play end point of the original play item PlayItem#2 is written to the play end point thereof. Furthermore, regarding the new play item PlayItem#3, seamless play is turned off as a connection condition of the immediately previous playlist PlayItem#2.

Figure 12:
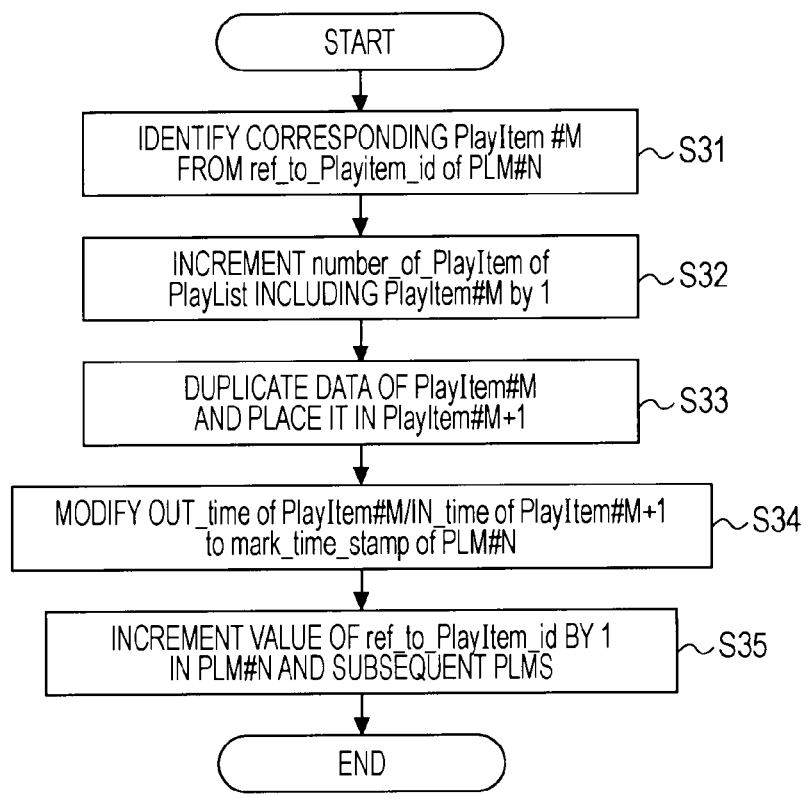
FIG. 12 is a flowchart showing a processing procedure for dividing a play item in a playlist.
Figure 13:
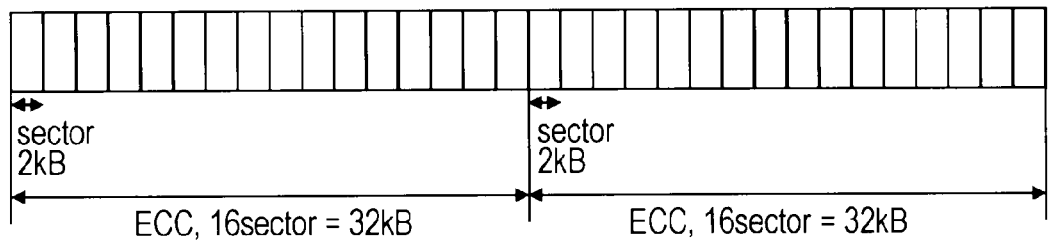
FIG. 13 is a diagram for explaining a file system management unit in a DVD-type recording medium.
Figure 14:
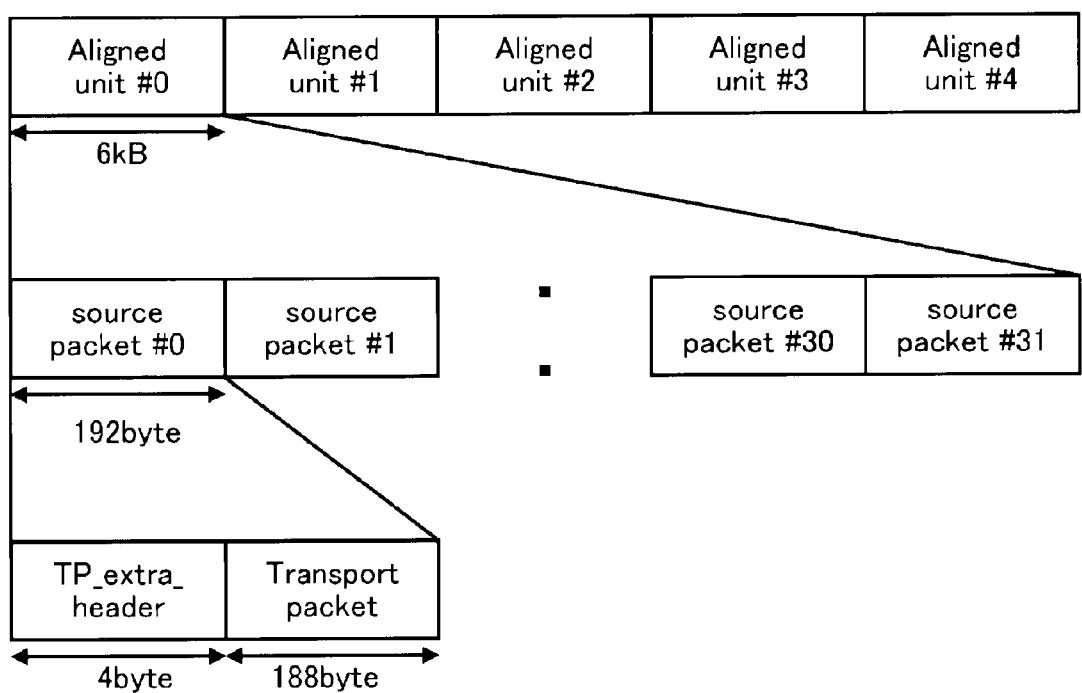
FIG. 14 is a diagram showing a structure of a stream file in the AVCHD standard.

FIG. 12 shows a processing procedure for dividing a play item in a playlist, in the form of a flowchart. Assume here that a play item PlayItem#M is divided at the position of a playlist mark PLM#N.

First, a play item PlayItem#M corresponding to a chapter that is to be copied is identified on the basis of a serial number of the play item (ref_to_PlayItem_id) held by the playlist mark PLM#N specified as a copy source chapter (step S31).

Then, before division, the number of play items (number_of_PlayItem held by the playlist including the relevant play item PlayItem#M is incremented by 1 (step S32).

Then, data of the play item PlayItem#M is once copied and the copied play item is arranged as a play item immediately after the copy source, i.e., as PlayItem#M+1 (step S33).

Then, the play end point (OUT_time) of the original play item PlayItem#M and the play start point (IN_time) of the copied play item PlayItem#M+1 are both modified to time stamp information (mark_time_stamp) held at the position of division, i.e., the playlist mark PLM#N (step S34).

However, in step S1, in a case where a play item in a real playlist is divided and where the division point does not coincide with a GOP boundary or the division point does not coincide with a management block unit of the file system or the length alignment restriction defined in the AVCHD standard so that the first extent must be copied, the play end time (OUT_time) of the play item that manages the preceding chapter is overwritten with the division point, and the play start time (IN_time) of the play item that manages the succeeding chapter is overwritten with the division point.

Then, in each playlist mark PLM after the playlist mark PLM#N at the position of division, the serial number (ref_to_PlayItem_id of the play item is individually incremented by 1 (step S35).

INDUSTRIAL APPLICABILITY

Hereinabove, the present invention has been described in detail with reference to specific embodiments. However, obviously, those skilled in the art can make modifications or alternatives of the embodiments without departing from the gist of the present invention.

The range of application of the present invention is not limited to the AVCHD standard. The present invention can be applied similarly to data processing apparatuses for editing content recorded on recording media according to various standard formats for recording management information files on recording media together with content data.

That is, the present invention has been disclosed by way of example, and the content described in this specification should not be construed restrictively. The gist of the present invention should be determined with reference to Claims.

The invention claimed is:

1. A data processing apparatus that executes processing for editing a stream file recorded on a recording medium according to a predetermined standard format, characterized in that:
the stream file has a GOP (Group of Picture) structure, in which a predetermined number of picture frames are collected into one set, data is recorded on the recording medium in units of an access block having a predetermined length, and the standard format defines a length alignment restriction regarding files,
the data processing apparatus comprises:
when the stream file is divided at an arbitrary division point into a preceding chapter and a succeeding chapter,
first means for copying a first extent of the succeeding chapter, formed of data in the proximity of a GOP including the division point, onto the recording medium;
second means for creating a stream file of the preceding chapter by giving padding in accordance with the length alignment restriction at a GOP boundary that appears first after the division point; and
third means for creating a stream file of the succeeding chapter formed of the first extent and a second extent, from a position where padding has been given at the beginning of the first extent of the succeeding chapter, formed of GOPs before or after the copied segment, or by giving padding in an end region of the second extent in accordance with the length alignment restriction.

2. The data processing apparatus according to claim 1, characterized in that:
the recording medium has recorded thereon a real playlist having a body of a stream file and in which one or more play items describing data regarding play segments in the stream file are arranged on a time axis according to a play order, and
the second means specifies a time of the division point as a play end time of a play item regarding the preceding chapter so that a portion after the division point becomes a non-display segment, and the third means specifies the time of the division point as a play start time of a play item regarding the succeeding chapter so that a portion of the first extent before the division point becomes a non-display segment.

3. The data processing apparatus according to claim 1, characterized in that:
the second means defines the file length of the preceding chapter to be up to the position where the padding has been given, and the third means defines the file length of the succeeding chapter to be from the position where padding has been given at the beginning of the first extent or up to the position where padding has been given in the second extent.

4. The data processing apparatus according to claim 1, characterized by further comprising:
file-name modifying means for modifying a file name of the stream file of the preceding or succeeding chapter.

5. The data processing apparatus according to claim 1, characterized in that:
on the recording medium, a real playlist having a body of the stream file and specifying a play segment of the stream is recorded, and it is possible to create a virtual playlist specifying a play segment of a stream whose body is possessed in the real playlist, and one or more play items describing data regarding play segments in the stream file are arranged on a time axis according to a play order in the real playlist and in the virtual playlist, and
means is further provided for modifying a stream file name indicated by a play item in the virtual playlist specifying the succeeding chapter as a play segment, in conjunction with modification of the file name of the stream file of the succeeding chapter by the file-name modifying means.

6. A data processing method of executing processing for editing a stream file recorded on a recording medium according to a predetermined standard format, characterized in that:
the stream file has a GOP (Group of Picture) structure, in which a predetermined number of picture frames are collected into one set, data is recorded on the recording medium in units of an access block having a predetermined length, and the standard format defines a length alignment restriction regarding files,
the data processing method comprises:
when the stream file is divided at an arbitrary division point into a preceding chapter and a succeeding chapter,
a first step of copying a first extent of the succeeding chapter, formed of data in the proximity of a GOP including the division point, onto the recording medium;
a second step of creating a stream file of the preceding chapter by giving padding in accordance with the length alignment restriction at a GOP boundary that appears first after the division point; and
a third step of creating a stream file of the succeeding chapter formed of the first extent and a second extent, from a position where padding has been given at the beginning of the first extent of the succeeding chapter, formed of GOPs before or after the copied segment, or by giving padding in an end region of the second extent in accordance with the length alignment restriction.

7. The data processing method according to claim 6, characterized in that:

the recording medium has recorded thereon a real playlist having a body of a stream file and in which one or more play items describing data regarding play segments in the stream file are arranged on a time axis according to a play order, and a time of the division point is specified in the second step as a play end time of a play item regarding the preceding chapter so that a portion after the division point becomes a non-display segment, and the time of the division point is specified in the third step as a play start time of a play item regarding the succeeding chapter so that a portion of the first extent before the division point becomes a non-display segment.

8. The data processing method according to claim 6, characterized in that:

the file length of the preceding chapter is defined in the second step to be up to the position where the padding has been given, and the file length of the succeeding chapter is defined in the third step to be from the position where padding has been given at the beginning of the first extent or up to the position where padding has been given in the second extent.

9. The data processing method according to claim 6, characterized by further comprising:

a file-name modifying step of modifying a file name of the stream file of the preceding or succeeding chapter.

10. The data processing method according to claim 9, characterized in that:

on the recording medium, a real playlist having a body of the stream file and specifying a play segment of the stream is recorded, and it is possible to create a virtual playlist specifying a play segment of a stream whose body is possessed in the real playlist, and one or more play items describing data regarding play segments formed of play start points and play end points in the stream are arranged on a time axis regarding play time according to a play order in the real playlist and in the virtual playlist, and a step of modifying a stream file name indicated by a play item in the virtual playlist specifying the succeeding chapter as a play segment, in conjunction with modification of the file name of the stream file of the succeeding chapter in the file-name modifying step, is further provided.

11. A computer program, written in a non-transitory recording medium in computer-readable format, for executing, on a computer, processing for editing a stream file recorded on the non-transitory recording medium according to a predetermined standard format, characterized in that: the stream file has a GOP (Group of Picture) structure, in which a predetermined number of picture frames are collected into one set, data is recorded on the non-transitory recording medium in units of an access block having a predetermined length, and the standard format defines a length alignment restriction regarding files, when the stream file is divided at an arbitrary division point into a preceding chapter and a succeeding chapter, the computer program causes the computer to execute: a procedure of copying a first extent of the succeeding chapter, formed of data in the proximity of a GOP including the division point, onto the non-transitory recording medium; a procedure of creating a stream file of the preceding chapter by giving padding in accordance with the length alignment restriction at a GOP boundary that appears first after the division point; a procedure of giving padding to create a stream file of the preceding chapter; and a procedure of creating a stream file of the succeeding chapter formed of the first extent and a second extent, from a position where padding has been given at the beginning of the first extent of the succeeding chapter, formed of GOPs before or after the copied segment, or by giving padding in an end region of the second extent in accordance with the length alignment restriction.

* * * * *